US012087502B2

(12) United States Patent
Yoshioka et al.

(10) Patent No.: US 12,087,502 B2
(45) Date of Patent: *Sep. 10, 2024

(54) INDUCTOR COMPONENT

(71) Applicant: Murata Manufacturing Co., Ltd., Kyoto (JP)

(72) Inventors: Yoshimasa Yoshioka, Nagaokakyo (JP); Keisuke Kunimori, Nagaokakyo (JP); Akinori Hamada, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/309,657

(22) Filed: Apr. 28, 2023

(65) Prior Publication Data

US 2023/0260696 A1 Aug. 17, 2023

Related U.S. Application Data

(62) Division of application No. 16/155,435, filed on Oct. 9, 2018, now Pat. No. 11,676,761.

(30) Foreign Application Priority Data

Oct. 17, 2017 (JP) ................................ 2017-201232

(51) Int. Cl.
*H01F 17/00* (2006.01)
*H01F 17/04* (2006.01)
(Continued)

(52) U.S. Cl.
CPC ....... *H01F 41/046* (2013.01); *H01F 17/0006* (2013.01); *H01F 17/0013* (2013.01);
(Continued)

(58) Field of Classification Search
CPC ............. H01F 17/0006; H01F 17/0013; H01F 17/0033; H01F 17/04; H01F 5/003;
(Continued)

(56) References Cited

U.S. PATENT DOCUMENTS 6,392,525 B1 * 5/2002 Kato ..................... H01F 27/022 336/200
2006/0119461 A1 * 6/2006 Kawarai ............... H01F 17/043 336/200
(Continued)

FOREIGN PATENT DOCUMENTS

CN 107039144 A 8/2017
JP 2004-014837 A 1/2004
(Continued)

OTHER PUBLICATIONS

An Office Action; "Notification of Reasons for Refusal," mailed by the Japanese Patent Office on Mar. 24, 2020, which corresponds to Japanese Patent Application No. 2017-201232 and is related to U.S. Appl. No. 16/155,435 with English language translation.
(Continued)

*Primary Examiner* — Tszfung J Chan
(74) *Attorney, Agent, or Firm* — Studebaker & Brackett PC

(57) ABSTRACT

An inductor component comprising a spiral wiring wound on a plane; a first magnetic layer and a second magnetic layer located at positions sandwiching the spiral wiring from both sides in a normal direction relative to the plane on which the spiral wiring is wound; a vertical wiring extending from the spiral wiring in the normal direction to pass through the first magnetic layer; and an external terminal disposed on a surface of the first magnetic layer to connect an end surface of the vertical wiring. The first magnetic layer has magnetic permeability lower than that of the second magnetic layer.

24 Claims, 9 Drawing Sheets

(51) Int. Cl.
*H01F 27/29* (2006.01)
*H01F 41/04* (2006.01)
*H01F 3/10* (2006.01)

(52) U.S. Cl.
CPC ......... *H01F 17/0033* (2013.01); *H01F 17/04* (2013.01); *H01F 27/292* (2013.01); *H01F 2003/106* (2013.01); *H01F 2017/0066* (2013.01); *H01F 2017/048* (2013.01)

(58) Field of Classification Search
CPC .. H01F 27/245; H01F 27/2804; H01F 27/292; H01F 27/323; H01F 2027/2809; H01F 2017/0066; H01F 2017/0073; H01F 2017/048
USPC .................................................. 336/200, 232
See application file for complete search history.

(56) References Cited

U.S. PATENT DOCUMENTS

| | | | | |
|---|---|---|---|---|
| 2009/0002117 | A1* | 1/2009 | Kawarai | H01F 17/0006 336/233 |
| 2010/0157565 | A1* | 6/2010 | Yoshida | H01G 4/33 361/811 |
| 2013/0234820 | A1* | 9/2013 | Yoo | H01F 17/0013 336/200 |
| 2013/0249662 | A1* | 9/2013 | Tonoyama | H01F 17/0013 336/200 |
| 2014/0286814 | A1* | 9/2014 | Kotani | H01F 1/33 419/30 |
| 2016/0055955 | A1* | 2/2016 | Park | H01F 27/292 336/83 |
| 2016/0086716 | A1* | 3/2016 | Choi | H01F 17/0013 427/127 |
| 2016/0163446 | A1 | 6/2016 | Park et al. | |
| 2016/0225513 | A1 | 8/2016 | Park et al. | |
| 2016/0260535 | A1* | 9/2016 | Kubota | H01F 17/0013 |
| 2017/0084376 | A1 | 3/2017 | Kubota et al. | |
| 2017/0098997 | A1 | 4/2017 | Hamada et al. | |
| 2017/0162317 | A1 | 6/2017 | Taniguchi et al. | |
| 2017/0169930 | A1 | 6/2017 | Kudo et al. | |
| 2018/0068770 | A1* | 3/2018 | Kawarai | H01F 27/28 |
| 2018/0286568 | A1 | 10/2018 | Suzuki | |
| 2019/0074125 | A1* | 3/2019 | Yoshioka | H01F 27/29 |
| 2019/0115150 | A1 | 4/2019 | Yoshioka et al. | |

FOREIGN PATENT DOCUMENTS

| | | | | | |
|---|---|---|---|---|---|
| JP | 2007066973 | A | * | 3/2007 | |
| JP | 2016-122836 | A | | 7/2016 | |
| JP | 2017-069523 | A | | 4/2017 | |
| JP | 2017-103360 | A | | 6/2017 | |
| JP | 2017-107971 | A | | 6/2017 | |
| WO | WO-2013051947 | A1 | * | 4/2013 | H01F 27/02 |
| WO | WO-2016013643 | A1 | * | 1/2016 | C09K 13/00 |

OTHER PUBLICATIONS

An Office Action; "Notification of Reasons for Refusal," Mailed by the Japanese Patent Office on Nov. 19, 2019, which corresponds to Japanese Patent Application No. 2017-201232 and is related to U.S. Appl. No. 16/155,435; with English language translation.

* cited by examiner

INDUCTOR COMPONENT

CROSS-REFERENCE TO RELATED APPLICATIONS

This application is a Divisional of U.S. patent application Ser. No. 16/155,435 filed Oct. 9, 2018, which claims benefit of priority to Japanese Patent Application 2017-201232 filed Oct. 17, 2017, the entire contents of which are incorporated herein by reference.

BACKGROUND

Technical Field

The present disclosure relates to an inductor component.

Background Art

Electronic devices such as notebooks, smart phones, and digital TVs are recently increasingly reduced in size and thickness. Accordingly, small-sized thin components of a surface mount type capable of reducing a mounting area are required for inductor components mounted on the electronic devices.

Japanese Unexamined Patent Application Publication No. 2016-122836 describes a method for manufacturing an electronic component comprising a step of forming a magnetic substance body comprising an inner coil part embedded therein; and a step of forming a cover part comprising a metal magnetic plate on at least one of an upper part and an lower part of the magnetic substance body. The electronic component described in Japanese Unexamined Patent Application Publication No. 2016-122836 comprises: a first inner coil part in the shape of planar coil on one surface of an insulating substrate; and a second inner coil part in the shape of planar coil on another surface opposite to the one surface of the insulating substrate.

SUMMARY

The electronic component described in Japanese Unexamined Patent Application Publication No. 2016-122836 has improved inductance acquisition efficiency by forming the cover part containing the metal magnetic plate on its upper and lower part. However, since the electronic component has a configuration in which an inner coil part is led out on a side surface of the chip so as to avoid the cover part and in which an external electrode is formed on said side surface of the chip, a region other than the spiral wiring wound on a plane in the inner coil part is required in a direction of the side surface, and thus a reduction of the mounting area was difficult. When a wiring is led out from the spiral wiring in up-down direction to pass through the cover part in order to reduce the mounting area, a certain volume of the metal magnetic plate corresponding to an area through which the wiring passes becomes a sacrifice, and an effect of improving the inductance acquisition efficiency is decreased.

The present disclosure was made in view of such problems, and is aimed at providing an inductor component which can reduce a mounting area and has decreased adverse effect on inductance acquisition efficiency.

Accordingly, an aspect of the present disclosure provides an inductor component comprising a spiral wiring wound on a plane; a first magnetic layer and a second magnetic layer located at positions sandwiching the spiral wiring from both sides in a normal direction relative to the plane on which the spiral wiring is wound; a vertical wiring extending from the spiral wiring in the normal direction to pass through the first magnetic layer; and an external terminal disposed on a surface of the first magnetic layer to connect an end surface of the vertical wiring. The first magnetic layer has magnetic permeability lower than that of the second magnetic layer.

According to the present disclosure, the inductor component comprises the vertical wiring extending from the spiral wiring in the normal direction, and the external terminal disposed on the surface of the first magnetic layer and connected to the end surface of the vertical wiring, and thus a mounting area of the inductor component can be reduced. Furthermore, according to the present disclosure, magnetic permeability of the first magnetic layer through which the vertical wiring passes is lower than magnetic permeability of the second magnetic layer, and thus reduction in effective magnetic permeability of the inductor component can be relatively prevented, and an adverse effect on inductance acquisition efficiency is small.

In an embodiment of the inductor component, the first magnetic layer and the second magnetic layer comprise a metal magnetic substance filler and a binding resin.

According to the above-mentioned embodiment, processability of the first magnetic layer is high, and thus the vertical wiring is allowed to readily pass through the first magnetic layer so as not to incur the reduction in the effective magnetic permeability of the inductor component.

In an embodiment of the inductor component, a cross section of the metal magnetic substance filler is exposed on an external principal surface of the first magnetic layer. In the above description, "exposed" means exposed to the outside of the first magnetic layer, and "exposed" shall include a case of being exposed to the outside of the first magnetic layer while covered with other member.

A fact that the cross section of the metal magnetic substance filler is exposed on the external principal surface of the first magnetic layer means that a processing such as grinding is applied on the external principal surface of the first magnetic layer. According to the above-mentioned embodiment, thinning of the inductor component can be accomplished since the first magnetic layer is grinded or the like.

In an embodiment of the inductor component, an external principal surface of the second magnetic layer is covered with an organic resin.

According to the above-mentioned embodiment, shedding of particles of the magnetic substance from the second magnetic layer can be prevented, and reduction in the effective magnetic permeability of the inductor component can be prevented. The organic resin may be the binding resin of the second magnetic layer, or may be an organic resin other than the binding resin of the second magnetic layer.

In an embodiment of the inductor component, whole of the external principal surface of the second magnetic layer is covered with the binding resin, and does not comprise a cross section of the metal magnetic substance filler exposed thereon.

According to the above-mentioned embodiment, shedding of particles of the magnetic substance from the second magnetic layer can be prevented, and reduction in the effective magnetic permeability of the inductor component can be prevented. Furthermore, since a grinding process of the second magnetic layer is unnecessary, manufacturing cost can be reduced.

In an embodiment of the inductor component, the metal magnetic substance filler in the first magnetic layer is substantially spherical, and the metal magnetic substance filler in the second magnetic layer comprises a flattened metal magnetic substance filler.

According to the above-mentioned embodiment, the second magnetic layer can have higher magnetic permeability relative to the first magnetic layer.

In the above-mentioned embodiment, the flattened metal magnetic substance filler is preferably disposed such that a major axis direction of the metal magnetic substance filler is substantially parallel to the plane on which the spiral wiring is wound. With this configuration, the second magnetic layer can have further higher magnetic permeability.

In the above-mentioned embodiment, it is preferable that the second magnetic layer is in the shape of a rectangle as viewed from above, and that a longer side of the rectangle is substantially parallel to the major axis direction of the flattened metal magnetic substance filler. When the second magnetic layer is in the shape of a rectangle, a length through which the magnetic flux flows reaches a maximum at the longer side of the second magnetic layer in the second magnetic layer. Therefore, when the major axis direction of the flattened metal magnetic substance filler contained in the second magnetic layer and the longer side of the second magnetic layer are substantially parallel to each other as viewed from above, the magnetic resistance can be reduced, and the acquisition efficiency of inductance can further be increased.

In an embodiment of the inductor component, a second magnetic layer comprises at least one of a pressed powder of a metal magnetic substance, a metal magnetic substance plate and a metal magnetic substance foil.

According to the above-mentioned embodiment, the second magnetic layer can have further increased magnetic permeability.

In the above-mentioned embodiment, a total content of the pressed powder of the metal magnetic substance, the metal magnetic substance plate and the metal magnetic substance foil in the second magnetic layer is preferably 90% by volume or more. In this case, the second magnetic layer can have furthermore increased magnetic permeability. As used herein, the "total content" is a ratio of a total volume of the pressed powder of the metal magnetic substance, the metal magnetic substance plate and the metal magnetic substance foil to a whole volume of the second magnetic layer including the pressed powder of the metal magnetic substance, the metal magnetic substance plate, the metal magnetic substance foil and the like.

In an embodiment of the inductor component, a region where an existing amount of the magnetic substance filler is smaller relative to the first magnetic layer and the second magnetic layer exists between the first magnetic layer and the second magnetic layer.

In the above-mentioned embodiment, the region where the existing amount of the magnetic substance filler is smaller serves as a pseudo nonmagnetic part. Accordingly, magnetic saturation characteristics can be improved by the region.

In the above-mentioned embodiment, a maximum distance between the first magnetic layer and the second magnetic layer with the region sandwiched therebetween is preferably from 0.5 μm to 30 μm. When the maximum distance is 0.5 μm or more, the magnetic saturation characteristics can be furthermore improved. When the maximum distance is 30 μm or less, reduction in effective magnetic permeability of the inductor component can be further prevented.

In an embodiment of the inductor component, the inductor component comprises an organic resin layer directly sandwiched between the first magnetic layer and the second magnetic layer which contains no magnetic substance filler. In the above description, "directly sandwiched" does not include a state of being sandwiched via another object between an object to sandwich and an object to be sandwiched, and it means a state of being sandwiched while the object to sandwich and the object to be sandwiched have direct contact with each other.

According to the above-mentioned embodiment, adhesion between the first magnetic layer and the second magnetic layer can be improved. In addition, the organic resin layer also serves as a nonmagnetic part since the metal magnetic substance filler does not exist in the organic resin layer, and thus the magnetic saturation characteristics can be improved.

In the above-mentioned embodiment, a maximum thickness of the organic resin layer is preferably from 0.5 μm to 30 μm. When the maximum thickness of the organic resin layer is 0.5 μm or more, adhesion between the first magnetic layer and the second magnetic layer can be furthermore improved, and magnetic saturation characteristics can be furthermore improved. When the maximum thickness of the organic resin layer is 30 μm or less, reduction in effective magnetic permeability of the inductor component can be further prevented.

In an embodiment of the inductor component, at least one of distances between a metal magnetic substance filler in the first magnetic layer and a metal magnetic substance filler in the second magnetic layer which is adjacent to said metal magnetic substance filler in the first magnetic layer is larger than a distance between metal magnetic substance fillers adjacent to each other in the first magnetic layer and the second magnetic layer. In this case, at least one of distances between a metal magnetic substance filler in the first magnetic layer and a metal magnetic substance filler in the second magnetic layer which is adjacent to said metal magnetic substance filler in the first magnetic layer is preferably from 0.5 μm to 3 μm. When at least one of the distances is 0.5 μm or more, the magnetic saturation characteristics can be furthermore improved. When at least one of the distances is 3 μm or less, reduction in the effective magnetic permeability of the inductor component can be further suppressed.

In an embodiment of the inductor component, the inductor component further comprises a void part directly sandwiched between the first magnetic layer and the second magnetic layer.

According to the above-mentioned embodiment, the inductor component includes the void part directly sandwiched between the first magnetic layer and the second magnetic layer. Therefore, when a load such as thermal shock is applied to the inductor component, a stress which may be generated due to a difference in linear expansion coefficient between different materials can be relaxed. The void part also serves as a nonmagnetic part. Therefore, magnetic saturation characteristics can be improved by the void part.

In the above-mentioned embodiment, a maximum thickness of the void part is preferably from 0.5 μm to 30 μm. When the maximum thickness of the void part is 0.5 μm or more, the effects of relaxation of stress and improving magnetic saturation characteristics are furthermore increased. On the other hand, when the void part has a maximum thickness of 30 μm or less, reduction in the effective magnetic permeability of the inductor component can be further prevented, and simultaneously, reduction in the strength of the element body can be prevented.

In the embodiment that the region where the existing amount of the magnetic substance filler is smaller exists in the inductor component, in the embodiment that the inductor component includes the organic resin layer containing no magnetic substance filler, or in the embodiment that at least one of distances between a metal magnetic substance filler in the first magnetic layer and a metal magnetic substance filler in the second magnetic layer which is adjacent to said metal magnetic substance filler in the first magnetic layer is from 0.5 μm to 3 μm in the inductor component as described above, the inductor component may have effective magnetic permeability of from 40 to 200. In this case, a degree of freedom in chip design is improved so that the thinning of the inductor component is further readily achieved.

In an embodiment of the inductor component, the spiral wiring is covered with an insulating layer at least at its wound portion.

According to the above-mentioned embodiment, insulation between the spiral wirings can be increased, and reliability of the inductor component can be further improved.

In an embodiment of the inductor component, the inductor component comprises a plurality of the spiral wiring, and further comprises a via conductor connecting the spiral wirings to each other in series between the plurality of spiral wiring, wherein the same layer as the via conductor comprising the via conductor comprises only a conductor, an inorganic filler and an organic resin.

According to the above-mentioned embodiment, the number of turns is increased due to an increase in the number of the spiral wiring, and thus, acquisition efficiency of inductance can be further increased. In addition, since the inductor component does not include a base material such as glass cloth between the spiral wirings which requires a certain thickness, thinning of the inductor component can be achieved even if the number of the spiral wiring is increased.

In an embodiment of the inductor component, the first magnetic layer has a thickness different from a thickness of the second magnetic layer.

According to the above-mentioned embodiment, since a degree of freedom in design of the magnetic layer thickness is increased, thin inductor component can be provided at lower cost.

According to the inductor component of the present disclosure, a mounting area of the inductor component can be reduced, and an adverse effect on inductance acquisition efficiency can be reduced.

DETAILED DESCRIPTION

Figure 1:
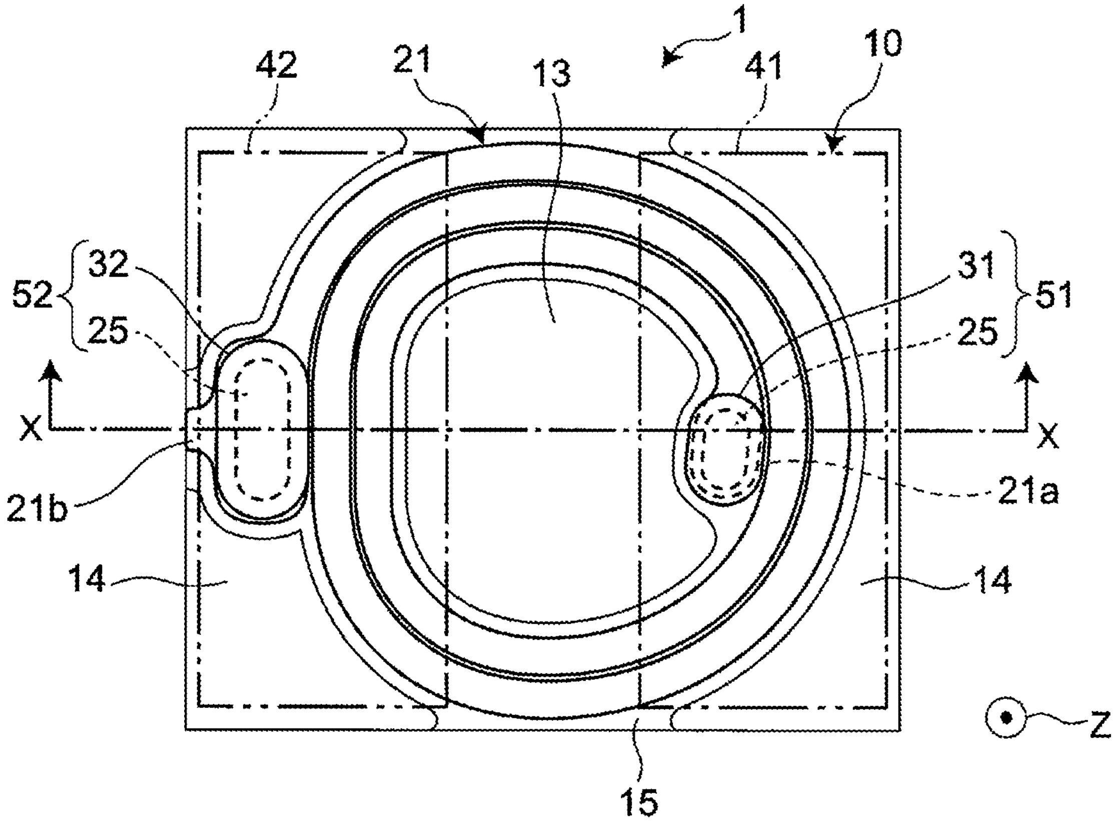
FIG. 1 is a perspective plane view of an inductor component according to a first embodiment.

Hereinafter, embodiments of the present disclosure will be described in detail with reference to the drawings. However, shapes, arrangements and the like of the coil components and the respective elements thereof according to the present disclosure are not limited to the embodiments described below and the structures shown in the drawings.

First Embodiment

Figure 2:
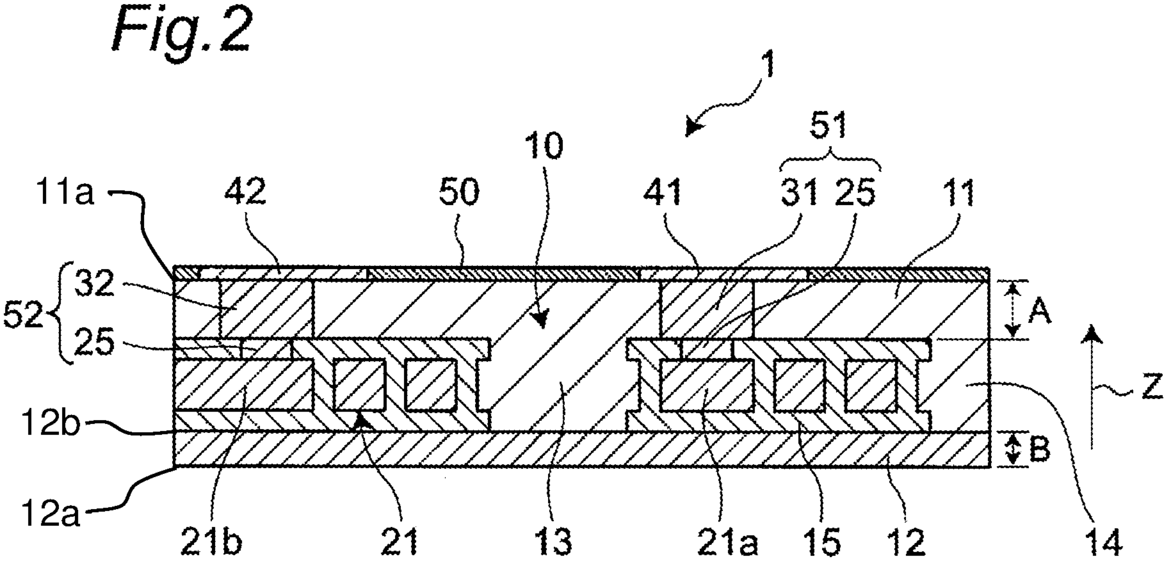
FIG. 2 is a cross-sectional view of the inductor component according to the first embodiment.

FIG. 1 is a perspective plane view showing an inductor component according to a first embodiment of the present disclosure. FIG. 2 is a cross-sectional view taken along a line X-X of the inductor component shown in FIG. 1. The inductor component 1 shown in FIG. 1 and FIG. 2 comprises a magnetic layer 10, an insulating layer 15, a spiral wiring 21, vertical wirings 51 and 52, external terminals (a first external terminal 41 and a second external terminal 42) and a coating film 50.

The inductor component 1 is mounted on various electronic components such as personal computers, DVD players, digital cameras, TVs, portable telephones, and automotive electronics, and is a component generally having a rectangular parallelepiped shape, for example. However, the shape of the inductor component 1 is not particularly limited and may be a circular columnar shape, a polygonal columnar shape, a truncated cone shape, or a truncated polygonal pyramid shape.

The inductor component 1 according to the present embodiment is an inductor composed of the spiral wiring 21. In the present specification, the "spiral wiring" means a curved wiring formed on a plane. The spiral wiring is not limited to a wiring composed only of curved line, and may have a linear portion in part.

The spiral wiring 21 is composed of a conductive material, and is wound on a plane. A normal direction relative to the plane on which the spiral wiring 21 is wound is defined as a Z direction (up-down direction) in the drawings, and it is assumed in the following description that the forward Z direction faces toward the upper side while a reverse Z direction faces toward the lower side. The definition of the Z direction is the same in other embodiments and examples. The spiral wiring 21 is spirally wound in an anticlockwise direction from its inner circumferential end 21*a* toward its outer circumferential end 21*b* as viewed from above.

The spiral wiring 21 may be composed of a metal having lower resistance such as Cu, Ag and Au. In the inductor component 1, the spiral wiring 21 is covered with a magnetic material constituting the magnetic layer 10, and has a closed magnetic path structure. It should be noted that at least one of paths of magnetic flux generated by the spiral wiring 21 making a circuit only needs to be a closed magnetic path (a path passing through only the magnetic layer), and it is not necessary for the spiral wiring 21 to be entirely surrounded by the magnetic layer 10.

Preferably, the spiral wiring 21 is a copper plating wiring formed by a SAP (Semi Additive Process). By use of the SAP, the spiral wiring with lower resistance and narrower pitch can be inexpensively formed. In the inductor component 1 according to the present embodiment, a columnar wiring described later may also be a copper plating wiring formed by the SAP similarly to the spiral wiring 21. The first external terminal 41, the second external terminal 42 and a connecting terminal described later may be formed by electroless Cu plating.

Via conductors 25 respectively connecting a first columnar wiring 31 and a second columnar wiring 32 to the spiral wiring 21 are provided on the inner circumferential end 21*a* and the outer circumferential end 21*b* of the spiral wiring 21. The first columnar wiring 31 and the via conductor 25 connecting the first columnar wiring 31 to the inner circumferential end 21*a* are collectively referred to as a first vertical wiring 51. The second columnar wiring 32 and the via conductor 25 connecting the second columnar wiring 32 to the outer circumferential end 21*b* are collectively referred to as a second vertical wiring 52.

The spiral wiring 21 is sandwiched from both sides (that is, from up and down) between the first magnetic layer 11 and the second magnetic layer 12 in a normal direction (that is, Z direction) relative to the plane on which the spiral wiring 21 is wound.

The first vertical wiring 51 and the second vertical wiring 52 extend from the spiral wiring 21 in the normal direction to pass through the first magnetic layer 11. Specifically, the first columnar wiring 31 constituting the first vertical wiring 51 and the second columnar wiring 32 constituting the second vertical wiring 52 pass through the first magnetic layer 11, and are formed in a normal direction relative to the plane on which the spiral wiring 21 is formed. In the spiral wiring 21, the current flows in the same plane (in a plane on which the spiral wiring 21 is formed). On the other hand, in the columnar wirings 31 and 32, the current does not flow in the plane on which the spiral wiring 21 is formed, and flows in the normal direction, for example.

With decreasing the chip size of the inductor component 1, the magnetic path is also relatively decreased, so that the magnetic flux density is increased and the magnetic saturation is likely to occur. In particular, in the magnetic layer 10, the inner magnetic path part 13 and the outer magnetic path part 14 have small cross section for the magnetic path, and are likely to reach magnetic saturation. As can be appreciated from FIG. 1, the inner magnetic path part 13 of the first magnetic layer 11 partially surrounds a portion of the first vertical wiring 51 in plan view. The magnetic flux generated by current flowing in the normal direction in the columnar wirings 31 and 32 does not pass through the inner magnetic path part 13 and the outer magnetic path part 14. Therefore, the magnetic saturation characteristics, that is, DC superimposition characteristics can be enhanced. In addition, the magnetic flux generated by the current flowing in the normal direction in the columnar wirings 31 and 32 passes through the magnetic layer 10, so that the inductance acquisition efficiency can be improved.

The fact that the columnar wirings 31 and 32 pass through the magnetic material means that the columnar wirings 31 and 32 are covered with the magnetic substance at its periphery in its extending direction, that is, a normal direction relative to the plane on which the spiral wiring 21 is formed. By this configuration, a closed magnetic path structure can be readily formed.

The external terminals 41 and 42 are provided on a surface of the first magnetic layer 11, and connected to an upper end surface of the vertical wirings 51 and 52. In the configuration shown in FIGS. 1 and 2, the first external terminal 41 is connected to the first vertical wiring 51, and the second external terminal 42 is connected to the second vertical wiring 52. The external terminals 41 and 42 are provided in order to be connected to an external circuit. Surfaces of the columnar wirings 31 and 32 exposed on a surface of the first magnetic layer 11 may be used as the external terminals 41 and 42. In this case, the external terminal 41 and 42 preferably have larger areas than areas of the columnar wirings 31 and 32 as viewed from above as shown in FIGS. 1 and 2. By this configuration, a connecting strength at the time of mounting can be ensured and an alignment margin for connecting a circuit wiring with the inductor component through a via at the time of mounting on the substrate can be ensured without reducing the volume of the first magnetic layer 11, so that a mounting reliability can be enhanced. In addition, a connecting terminal (dummy external terminal) may also be provided on a surface of the first magnetic layer 11 which is not electrically connected to the spiral wiring 21 and is connected to the external circuit.

Since the inductor component 1 according to the present embodiment includes the vertical wirings 51 and 52 extending from the spiral wiring 21 in the normal direction and the external terminals 41 and 42 provided on the surface of the first magnetic layer 11 and connected to end surfaces of the vertical wirings 51 and 52, the inductor component 1 does not require a region other than the spiral wiring 21 in a direction of a side surface of the spiral wiring 21, and thus the mounting area can be reduced. The direction of the side surface as described above means a direction orthogonal to the Z direction (a direction parallel to the plane on which the spiral wiring 21 is wound).

A coating film 50 for improving insulation may be formed on the surface of the first magnetic layer 11. The coating film

50 may be a photosensitive resist made of an organic insulating resin such as polyimide, phenol resin, epoxy resin; a solder resist or the like. With the coating film 50, the external terminals 41 and 42 and the connecting terminal if present can be readily formed by use of the opening part of the coating film 50 as a guide pattern when the external terminals 41 and 42 and the connecting terminal if present are formed on the surface of the first magnetic layer 11.

Rust prevention by Ni, Au and the like and/or solder corrosion preventive measures by Ni, Sn and the like may be applied to the surfaces of the first external terminal 41, the second external terminal 42 (and the connecting terminal if it is present).

The spiral wiring 21 may be covered with the insulating layer 15 at least at its wound portion. Providing the insulating layer 15 can increase insulation between the spiral wirings 21 to further improve the reliability of the inductor component. The insulating layer 15 may contain an organic resin and a nonmagnetic inorganic filler. The organic resin contained in the insulating layer 15 may be selected from a group consisting of polyimide, epoxy and phenol, for example. The nonmagnetic inorganic filler contained in the insulating layer may be silica (as an example, $SiO_2$ filler having an average particle diameter of 0.5 μm or less), for example. In the inductor component 1 shown in FIGS. 1 and 2, the periphery of the spiral wiring 21 is covered with the insulating layer 15 to accomplish a configuration where the spiral wiring 21 and the magnetic layers (the first magnetic layer 11 and the second magnetic layer 12) have no contact with each other. However, the covering with the insulating layer 15 is not necessary since the magnetic layer itself has insulation properties. When the insulating layer 15 is not provided, the acquisition efficiency of inductance can be further increased since the volume of the magnetic layer can be made relatively larger. On the other hand, by the insulating layer 15, a short circuit via the metal magnetic substance between the spiral wirings 21 can be prevented even when the space between the spiral wirings 21 is quite narrow, and thus the inductor component with high reliability can be provided.

A width of the space between the spiral wirings 21 is preferably from 3 μm to 20 μm. By setting the width of the space to 20 μm or less, the width of the spiral wiring 21 can be made relatively larger, and thus direct-current resistance can be reduced. By setting the width of the space to 3 μm or more, insulation between the spiral wirings 21 can be sufficiently ensured. In the example of the inductor component 1 according to the present embodiment, the width of the spiral wiring 21 is 60 μm, and the width of the space between the spiral wirings 21 is 10 μm.

The thickness of the spiral wiring 21 is preferably from 40 μm to 120 μm. By setting the thickness to 40 μm or more, direct-current resistance can be sufficiently reduced. By setting the thickness to 120 μm or less, wiring aspect is prevented from becoming extremely large, and process variations can be suppressed. In the example of the inductor component 1 according to the present embodiment, a wiring thickness of the spiral wiring 21 is 70 μm. As used herein, a width of the spiral wiring 21 is a dimension at a side orthogonal to the Z direction in a traverse section orthogonal to an extending direction of the spiral wiring 21, and the thickness of the spiral wiring 21 is a dimension along the Z direction in the traverse section.

The thickness of the insulating layer 15 between the magnetic layer and the spiral wiring 21 is preferably from 3 μm to 50 μm. When the thickness is 3 μm or more, contact between the spiral wiring 21 and the magnetic substance in the magnetic layer can be reliably prevented. When the thickness is 50 μm or less, magnetic layer can be made relatively larger, and thus magnetic saturation characteristics and acquisition efficiency of inductance can be improved. Furthermore, when the magnetic layer is not made larger, thinning of the inductor component 1 and reduction in the mounting area can be accomplished instead. In the example of the inductor component 1 according to the present embodiment, the thickness of the insulating layer 15 between the spiral wiring 21 and the magnetic layer is 10 μm in the normal direction (Z direction) relative to the plane on which the spiral wiring 21 is wound, and 25 μm in a direction parallel to the plane on which the spiral wiring 21 is wound (that is, the thickness of the insulating layers 15 between the inner magnetic path part 13 and the spiral wiring 21 and between the outer magnetic path part 14 and the spiral wiring 21).

Preferably, the number of turns of the spiral wiring 21 is 5 or less. When the number of turns is 5 or less, a loss of a proximity effect can be reduced for a high-frequency switching operation such as from 50 MHz to 150 MHz. On the other hand, in the case of use in a low frequency switching operation at 1 MHz or the like, the number of turns is preferably 2.5 or more. By increasing the number of turns, the inductance can be increased, and an inductor ripple current can be decreased. In the inductor component 1 shown in FIGS. 1 and 2, the number of turns of the spiral wiring 21 is 2.5.

The first magnetic layer 11 may have a thickness different from that of the second magnetic layer 12, or may also have the same thickness as the second magnetic layer 12. Preferably, the first magnetic layer has a thickness different from that of the second magnetic layer. In this case, since a degree of freedom in design of the magnetic layer thickness is increased, thin inductor component can be provided at lower cost.

By increasing the thickness of the second magnetic layer 12, the effective magnetic permeability of the entire inductor component 1 is increased, and the acquisition efficiency of inductance is increased.

By increasing the thickness of the first magnetic layer 11, the adverse effects due to the magnetic flux leakage such as an eddy current loss by the land pattern can be effectively suppressed. As described later, the second magnetic layer 12 has a magnetic permeability higher than that of the first magnetic layer 11 so that the magnetic flux leakage is less likely to occur in the second magnetic layer 12. In addition, by increasing the thickness of the first magnetic layer 11, an occurrence of the magnetic flux leakage in the first magnetic layer 11 can also be reduced.

The thicknesses of the first magnetic layer 11 and the second magnetic layer 12 are preferably from 10 μm to 200 μm, respectively. By setting the thickness of the magnetic layer to 10 μm or more, failure caused by exposure of the spiral wiring 21 due to process variations during grinding of the magnetic layer can be effectively prevented. In addition, by setting the thickness of the magnetic layer to 10 μm or more, reduction in the effective magnetic permeability due to shedding of particles of the magnetic substance can be effectively prevented. By setting the thickness of the magnetic layer to 200 μm or less, thinning of the inductor component 1 can be achieved. In the example of the inductor component 1 according to the present embodiment, the thickness of the first magnetic layer 11 is 42.5 μm, and the thickness of the second magnetic layer 12 is 42.5 μm.

The thicknesses and the sizes of the first external terminal 41, the second external terminal 42 and the coating film 50 may be adjusted appropriately in terms of the thickness of the entire inductor component 1 and the mounting reliability. In the example of the inductor component 1 according to the present embodiment, the thicknesses of the first external terminal 41 and the second external terminal 42 including the rust prevention treatment by Ni plating and Au plating is made up of the electroless copper plating thickness of 5 μm, the Ni plating thickness of 5 μm, and the Au plating thickness of 0.1 μm. The thickness of the coating film 50 is 5 μm.

From the above, according to the example of the inductor component 1 according to the present embodiment, a thin inductor having a chip size of 1210 (1.2 mm×1.0 mm) and a thickness of 0.200 mm can be provided.

In the inductor component 1 according to the present embodiment, the magnetic permeability of the first magnetic layer 11 is lower than the magnetic permeability of the second magnetic layer 12. The vertical wiring passes through the first magnetic layer having lower magnetic permeability while the vertical wiring is not provided inside the second magnetic layer having higher magnetic permeability. Therefore, reduction in effective magnetic permeability of the inductor component can be relatively suppressed, and the adverse effect on inductance acquisition efficiency becomes smaller.

A method of analyzing the magnetic permeability will be described. A magnitude of the magnetic permeability can be evaluated by a first, a second, or a third analysis method described below. The first or the second analysis method is basically used for the measurement, and only when the first or the second analysis method cannot be used, the third analysis method is used for the measurement.

As the first analysis method, when the magnetic material can be obtained in a form of liquid, a sheet and the like, the material can be processed into a sheet, a plate, or a block shape, and the magnetic permeability can be acquired by a known impedance measurement method.

As the second analysis method, for example, an inductance of a chip is measured in the chip state, and one surface of its magnetic layer is then removed by grinding, etching or the like. Then, the inductance is measured again. Subsequently, effective magnetic permeability as an inductance corresponding to each state can be obtained through electromagnetic-field simulation (e.g., HFSS of Ansys) to calculate the magnetic permeability of the first magnetic layer and the magnetic permeability of the second magnetic layer in the chip state.

As the third analysis method, determination can be made from a cross section of an SEM image based on general known knowledge. For example, according to the result of EDX analysis, if magnetic powder of the same material system is used, the magnetic permeability is higher in a magnetic material having a larger particle diameter or a magnetic material having a larger amount of magnetic powder than a magnetic material having a smaller particle diameter or a magnetic material having a smaller amount of magnetic powder. The SEM image to be acquired may be obtained from a cross section taken by cutting the center on the longitudinal side of the chip. The magnification of the SEM image is preferably from 200 to 2000 times.

In the inductor component 1 according to the present embodiment, the first magnetic layer 11 and the second magnetic layer 12 may contain a metal magnetic substance filler and a binding resin as a binder for the metal magnetic substance filler. By this configuration, processability of the first magnetic layer 11 is improved, and thus the vertical wiring can be readily passed through the first magnetic layer 11 so as not to incur reduction in the effective magnetic permeability of the inductor component by processing such as shedding of the metal magnetic substance filler from the binding resin.

A cross section of the metal magnetic substance filler may be exposed on the external principal surface 11*a* of the first magnetic layer 11. This means that processing such as grinding is applied to the external principal surface 11*a* of the first magnetic layer. Since the first magnetic layer is grinded or the like, the thickness of the first magnetic layer 11 can be adjusted appropriately by grinding or the like to readily accomplish further thinning of the inductor component 1.

The binding resin contained in the first magnetic layer 11 may be, for example, an organic insulating material such as epoxy-based resin, bismaleimide, liquid crystal polymer and polyimide. The magnetic substance (preferably, substantially spherical metal magnetic substance filler) contained in the first magnetic layer 11 may be FeSi-based alloy such as FeSiCr; FeCo-based alloy; Fe-based alloy such as NiFe; and an amorphous alloy thereof. By use of Fe-based magnetic substance, larger magnetic saturation characteristics can be acquired as compared to ferrite and the like.

An average particle diameter of the metal magnetic substance filler contained in the first magnetic layer 11 is preferably 5 μm or less. In the present specification, "an average particle diameter" means a volume-basis median diameter. When the average particle diameter is 5 μm or less, generation of an eddy current can be prevented to decrease a loss at high frequency. Therefore, the inductor component 1 with a smaller loss even at a high frequency such as 150 MHz can be obtained.

On the other hand, when the inductor component 1 is used at a lower frequency, an effect of an eddy current loss is smaller compared to a case of higher frequency use. Therefore, an average particle diameter of the metal magnetic substance filler may be increased in order to increase the magnetic permeability. As an example, large-sized metal magnetic substance filler particles having an average particle diameter of from 30 μm to 100 μm and small-sized metal magnetic substance filler particles of 10 μm or less may be mixed with each other. In this case, the filling amount of the magnetic substance can be increased by the small-sized metal magnetic substance filler particles filled in the gaps between the large-sized metal magnetic substance filler particles so that higher magnetic permeability at a frequency such as from 1 MHz to 10 MHz can be achieved.

A content rate of the metal magnetic substance filler in the first magnetic layer 11 is preferably from 50% by volume to 85% by volume with respect to the binding resin. By setting the content rate of the metal magnetic substance filler to 50% by volume or more, effective magnetic permeability can be increased, and the number of turns of the spiral wiring 21 required to acquire a desired inductance value can be decreased. As a result, a loss at high frequency due to a proximity effect and a direct-current resistance can be reduced. When the content rate of the metal magnetic substance filler is 85% by volume or less, fluidity of the binding resin containing the metal magnetic substance filler during the manufacturing process can be improved so that the filling property of the metal magnetic substance filler is improved. As a result, effective magnetic permeability can be improved, and the strength of the magnetic layer can also be improved.

Then, the second magnetic layer 12 will be described below. The second magnetic layer 12 may have the same composition as that of the first magnetic layer 11, or may have a composition different from that of the first magnetic layer 11. When the second magnetic layer 12 has a composition different from that of the first magnetic layer 11, magnetic permeability may be changed continuously or discontinuously at an interface between the first magnetic layer 11 and the second magnetic layer 12. For example, a filling amount of the magnetic substance is gradually reduced or an average particle diameter of the magnetic substance is gradually decreased from the second magnetic layer 12, and a region with lower magnetic permeability may be defined as the first magnetic layer 11. In this case, the magnetic permeability is continuously changed at the interface between the first magnetic layer 11 and the second magnetic layer 12. Alternatively, after the inner magnetic path part 13 and the outer magnetic path part 14 are filled with the first magnetic layer 11, the second magnetic layer 12 may be press-bonded. In this case, the magnetic permeability is discontinuously changed at the interface between the first magnetic layer 11 and the second magnetic layer 12.

In the inductor component 1 according to the present embodiment, a first external principal surface 12*a* of the second magnetic layer 12 is preferably covered with an organic resin. This can suppress shedding of particles of the magnetic substance from the second magnetic layer 12, and further increase the effective magnetic permeability of the inductor component.

Alternatively, an entire surface of the external principal surface (including the first external principal surface 12*a* and the second external principal surface 12*b*) of the second magnetic layer 12 is preferably covered with the binding resin so that a cross section of the metal magnetic substance filler is not exposed on the surface. This configuration can also suppress the shedding of particles of the magnetic substance from the second magnetic layer 12, and suppress the reduction in the effective magnetic permeability of the inductor component. Furthermore, this configuration means that the surface of the second magnetic layer 12 is not grinded. Since this configuration does not require the grinding process of the second magnetic layer 12, the manufacturing cost can be decreased.

In the inductor component 1 according to the present embodiment, it is preferable that the magnetic substance filler in the first magnetic layer is substantially spherical, and that the metal magnetic substance filler in the second magnetic layer 12 includes flattened filler. When an aeolotropic material such as the flattened metal magnetic substance filler exists in the second magnetic layer 12, magnetic resistance can be decreased, and the magnetic permeability of the second magnetic layer can be further increased. In the present specification, "substantially spherical" metal magnetic substance filler means that an aspect ratio (a/b) defined by a ratio of a major axis "a" to a minor axis "b" of the metal magnetic substance filler is less than or equal to 1.5. In the present specification, a maximum dimension of the metal magnetic substance filler on a cross section parallel to a direction of a magnetic flux passing through the magnetic path (a plane parallel to the L direction in the magnetic layer, a plane parallel to the T direction in the inner magnetic path) is defined as the major axis, and a maximum dimension orthogonal to the major axis is defined as the minor axis. In the preset specification, "flattened" metal magnetic substance filler means that the aspect ratio (a/b) defined by a ratio of a major axis "a" to a minor axis "b" of the metal magnetic substance filler is 2.0 or more and 20 or less. The flattened metal magnetic substance filler may be needle-shaped.

The aeolotropic metal magnetic substance filler as described above may be mixed and used with a substantially spherical (that is, isotropic) metal magnetic substance filler. With such a configuration, gaps between the aeolotropic metal magnetic substance fillers are filled by the isotropic metal magnetic substance filler so that the magnetic permeability can be further increased. When the aeolotropic metal magnetic substance filler is mixed with the isotropic metal magnetic substance filler, the content of the aeolotropic metal magnetic substance filler is preferably larger than the content of the isotropic metal magnetic substance filler. The magnetic permeability can be furthermore increased by an adjustment of the contents in this manner.

The metal magnetic substance filler contained in the second magnetic layer 12 may be, for example, NiFe-based alloy such as NiFe; FeCo-based alloy; FeSi-based alloy such as FeSiCr or an amorphous alloy thereof. The binding resin contained in the second magnetic layer may be, for example, epoxy-based resin, liquid crystal polymer, bismaleimide, polyimide or phenol resin.

Preferably, the flattened metal magnetic substance filler is disposed such that the major axis direction of the metal magnetic substance filler is substantially parallel to the plane on which the spiral wiring 21 is wound. The magnetic permeability of the second magnetic layer 12 can be further increased by such a configuration. In the present specification, "substantially parallel to the plane on which the spiral wiring is wound" means that an angle of the major axis direction of the metal magnetic substance filler to the plane on which the spiral wiring 21 is wound is ±15°. When a plurality of the major axis direction exist for the flattened metal magnetic substance filler existing in the second magnetic layer 12, a direction which the major axes of majority of the metal magnetic substance fillers contained in the second magnetic layer 12 point is defined as the major axis direction.

Preferably, the second magnetic layer 12 is in the shape of a rectangle as viewed from above, and a longer side of the rectangle is substantially parallel to the major axis direction of the flattened metal magnetic substance filler. When the second magnetic layer 12 is in the shape of a rectangle, a length through which the magnetic flux flows reaches a maximum at the longer side of the second magnetic layer 12 in the second magnetic layer 12. Therefore, when the major axis direction of the flattened metal magnetic substance filler contained in the second magnetic layer 12 and the longer side of the second magnetic layer 12 are substantially parallel to each other as viewed from above, the magnetic resistance can be reduced, and the acquisition efficiency of inductance can be further increase. In the present specification, "the major axis direction of the flattened metal magnetic substance filler contained in the second magnetic layer 12 and the longer side of the second magnetic layer 12 are substantially parallel to each other as viewed from above" means that an angle of the major axis direction of the metal magnetic substance filler to the longer side of the second magnetic layer 12 is ±35° as viewed from above.

Alternatively, the second magnetic layer 12 may contain at least one of a pressed powder of a metal magnetic substance, metal magnetic substance plate and metal magnetic substance foil. When the second magnetic layer 12 contains at least one of the pressed powder of the metal magnetic substance, the metal magnetic substance plate and the metal magnetic substance foil, the magnetic permeability of the second magnetic layer can be further increased.

A total content of the pressed powder of the metal magnetic substance, the metal magnetic substance plate and the metal magnetic substance foil in the second magnetic layer 12 is preferably 90% by volume or more. In this case, the magnetic permeability of the second magnetic layer can be furthermore increased.

For example, the second magnetic layer 12 may contain at least one of the pressed powder of the metal magnetic substance, the metal magnetic substance plate and the metal magnetic substance foil selected from a group consisting of Fe, Si, B, Cr, Al, Nb, Ni and Cu. When the second magnetic layer 12 contains the pressed powder of the metal magnetic substance, the second magnetic layer 12 may be formed by press-bonding pulverized metal piece and an organic insulating material made of epoxy-based resin, bismaleimide, liquid crystal polymer, polyimide, phenol resin and the like. In this case, an average particle diameter of the metal piece is preferably 100 μm or less. On the other hand, the metal magnetic substance plate and the metal magnetic substance foil preferably have a thickness of 10 μm or less. The second magnetic layer 12 may also be formed by laminating a plurality of layers containing any one of the pressed powder of the metal magnetic substance, the metal magnetic substance plate and the metal magnetic substance foil. With such a configuration, quite high magnetic permeability can be acquired while preventing an eddy current loss in the second magnetic layer 12.

(Manufacturing Method)

Then, a method of manufacturing the inductor component according to the first embodiment will be described.

Figure 3A:
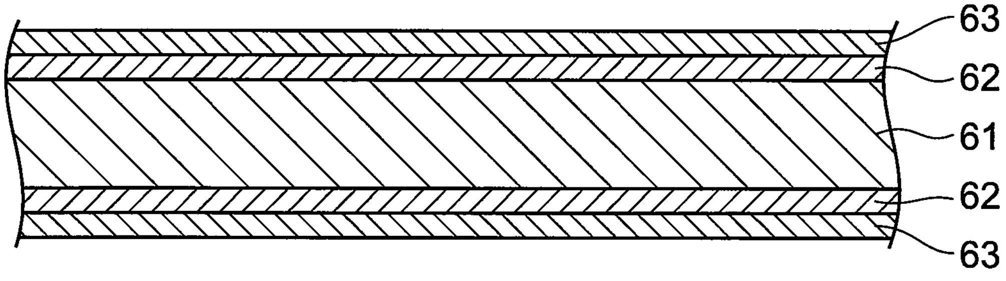
FIG. 3A is an explanatory view for explaining the manufacturing method of the inductor component according to the first embodiment.

As shown in FIG. 3A, a dummy core substrate 61 is prepared. The dummy core substrate 61 has a substrate copper foil on both sides. In the present embodiment, the dummy core substrate 61 is a glass epoxy substrate. Since the thickness of the dummy core substrate 61 does not affect the thickness of the inductor component, the dummy core substrate with a thickness which is easy to handle in light of warpage on processing may be used appropriately.

Then, the copper foil 62 is adhered on a surface of the substrate copper foil. The copper foil 62 is adhered on a smooth surface of the substrate copper foil. Therefore, adhesion force between the copper foil 62 and the substrate copper foil can be weakened, and the dummy core substrate 61 can be easily peeled from the copper foil 62 in a subsequent process. Preferably, an adhesive bonding the dummy core substrate 61 and the dummy metal layer (copper foil 62) is an adhesive with low tackiness. For weakening of the adhesion force between the dummy core substrate 61 and the copper foil 62, it is desirable that the adhesion surfaces of the dummy core substrate 61 and the copper foil 62 are glossy surfaces.

Subsequently, an insulating layer 63 is laminated on the copper foil 62. At this time, the insulating layer 63 is thermally press-bonded with a vacuum laminator, a press machine or the like and thermally cured.

Figure 3B:
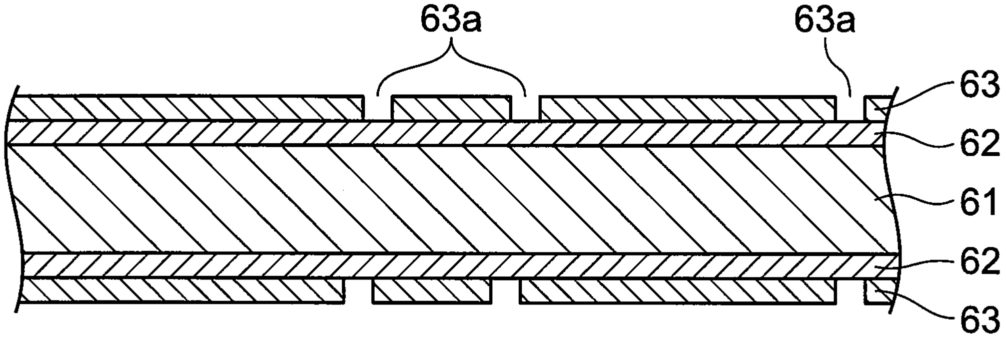
FIG. 3B is an explanatory view for explaining the manufacturing method of the inductor component according to the first embodiment.
Figure 3C:
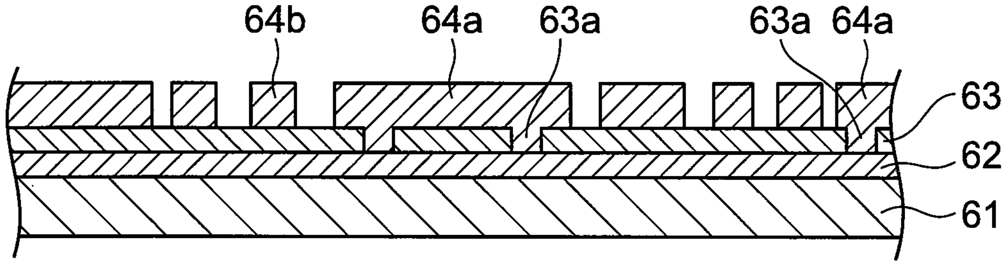
FIG. 3C is an explanatory view for explaining the manufacturing method of the inductor component according to the first embodiment.

As shown in FIG. 3B, an opening part 63*a* is formed by laser processing or the like on the insulating layer 63. Then, as shown in FIG. 3C, a dummy copper 64*a* and a spiral wiring 64*b* are formed on the insulating layer 63. Specifically, a power supply film (not shown) for SAP is formed on the insulating layer 63 by electroless plating, sputtering, vapor deposition or the like. After formation of the power supply film, a photosensitive resist is applied or pasted onto the power supply film, and the opening part of the photosensitive resist is formed on a place to be a wiring pattern by photolithography. Subsequently, a metal wiring corresponding to the dummy copper 64*a* and the spiral wiring 64*b* is formed in the opening part of the photosensitive resist layer. After the formation of the metal wiring, the photosensitive resist is peeled and removed by a chemical liquid, and the power supply film is etched and removed. This metal wiring is then used as a power feeding part, and narrow-spaced wirings can be obtained by applying additional copper electrolytic plating. In the example of the manufacturing method according to the present embodiment, a copper wiring having L (a wiring width)/S (a space between wirings)/t (a wiring thickness) of 40 μm/30 μm/45 μm is formed by SAP, and then, the additional copper electrolytic plating can be carried out to obtain a wiring having L/S/t=60 μm/10 μm/70 μm. The opening part 63*a* formed by SAP in FIG. 3B is filled with copper.

Figure 3D:
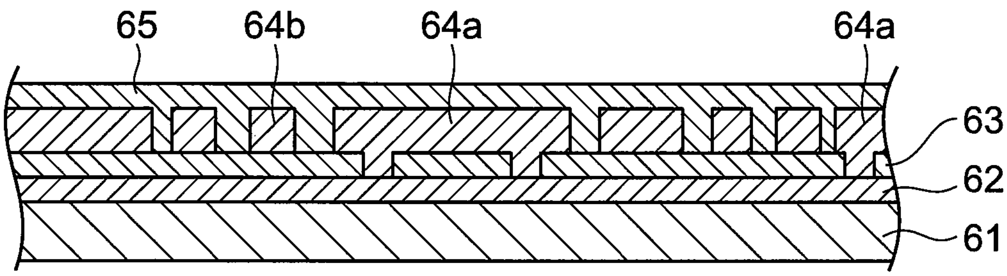
FIG. 3D is an explanatory view for explaining the manufacturing method of the inductor component according to the first embodiment.

Then, as shown in FIG. 3D, the dummy copper 64*a* and the spiral wiring 64*b* are covered with an insulating layer 65. The insulating layer 65 is thermally press-bonded by a vacuum laminator, a press machine or the like and thermally cured.

Figure 3E:
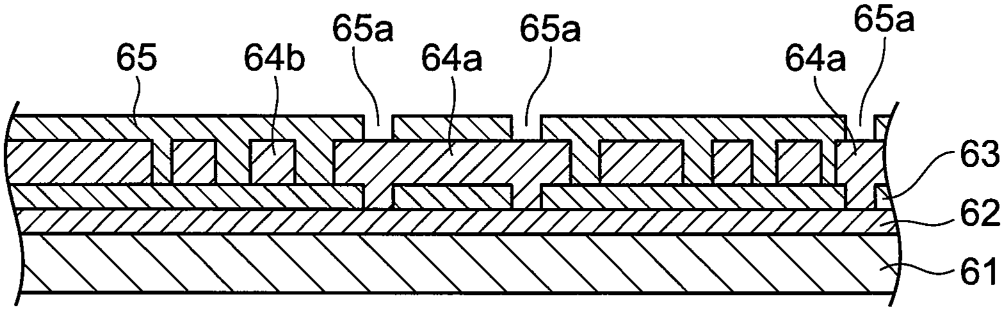
FIG. 3E is an explanatory view for explaining the manufacturing method of the inductor component according to the first embodiment.

Subsequently, as shown in FIG. 3E, an opening part 65*a* is formed on the insulating layer 65 by laser processing or the like.

Figure 3F:
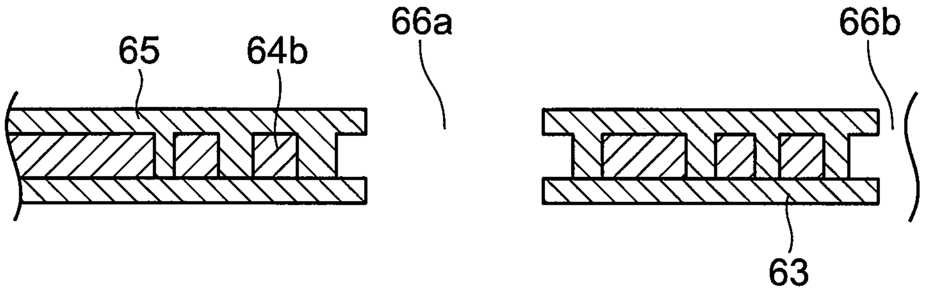
FIG. 3F is an explanatory view for explaining the manufacturing method of the inductor component according to the first embodiment.

Subsequently, the dummy core substrate 61 is peeled off from the copper foil 62. Then, the copper foil 62 is removed by etching or the like, and the dummy copper 64*a* is removed by etching or the like to form a hole part 66*a* corresponding to the inner magnetic path part 13 and a hole part 66*b* corresponding to the outer magnetic path part 14 as shown in FIG. 3F.

Figure 3G:
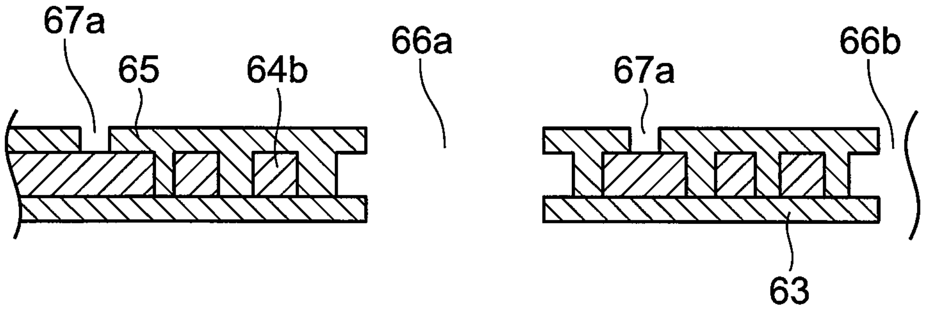
FIG. 3G is an explanatory view for explaining the manufacturing method of the inductor component according to the first embodiment.
Figure 3H:
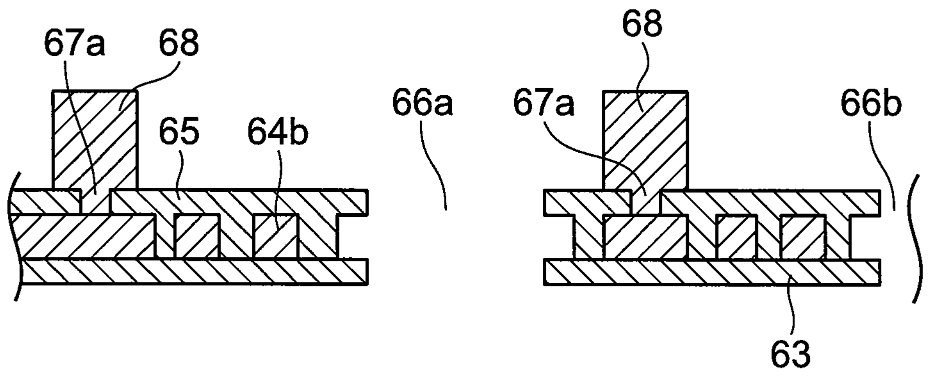
FIG. 3H is an explanatory view for explaining the manufacturing method of the inductor component according to the first embodiment.

Then, as shown in FIG. 3G, opening parts 67*a* are formed on the insulating layer 65 by laser processing or the like. Then, as shown in FIG. 3H, the opening parts 67*a* are filled with copper by SAP to form columnar wirings 68 on the insulating layer 65.

Figure 3I:
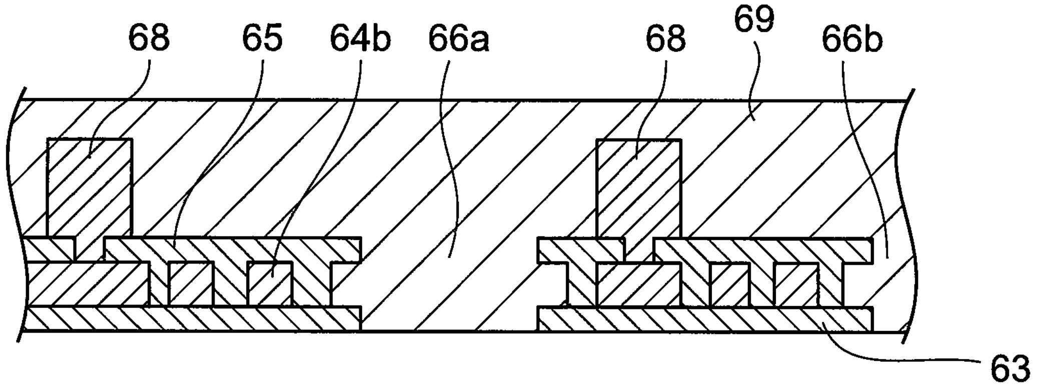
FIG. 3I is an explanatory view for explaining the manufacturing method of the inductor component according to the first embodiment.

Then, as shown in FIG. 3I, the spiral wiring, the insulating layer and the columnar wirings are covered with a magnetic material (magnetic layer) 69 corresponding to the first magnetic layer 11 to form an inductor substrate. The magnetic material 69 is thermally press-bonded by a vacuum laminator, a press machine or the like and thermally cured. At this time, the magnetic material 69 is also filled into the hole parts 66*a* and 66*b*.

Figure 3J:
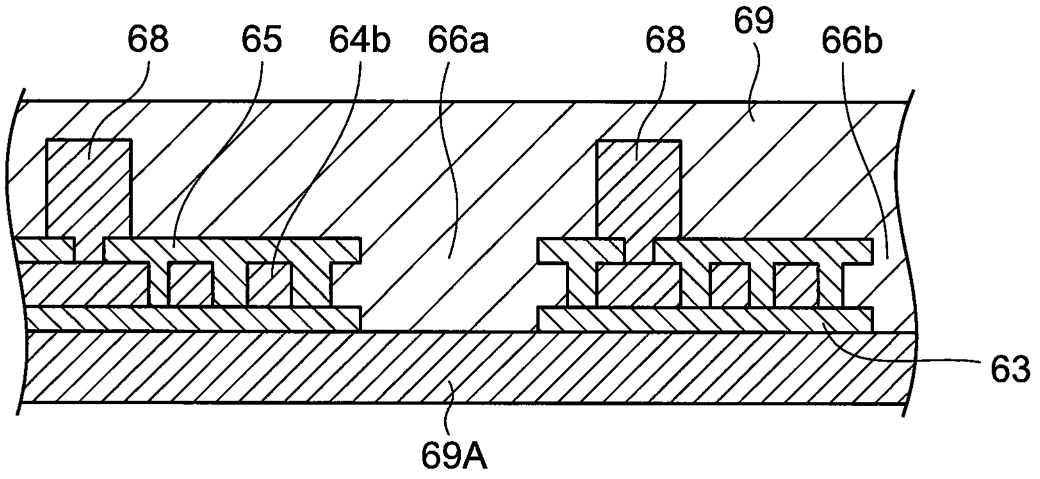
FIG. 3J is an explanatory view for explaining the manufacturing method of the inductor component according to the first embodiment.

Then, as shown in FIG. 3J, a magnetic material 69A corresponding to the second magnetic layer 12 was thermally press-bonded on a surface opposite to the magnetic material 69 corresponding to the first magnetic layer 11 by a vacuum laminator, a press machine or the like and thermally cured.

Figure 3K:
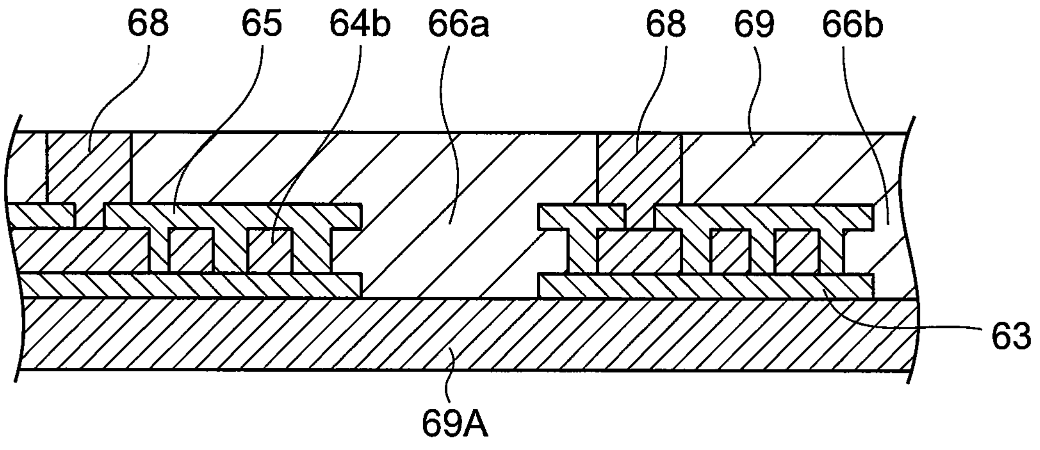
FIG. 3K is an explanatory view for explaining the manufacturing method of the inductor component according to the first embodiment.

Then, as shown in FIG. 3K, the magnetic material 69 and optionally the magnetic material 69A are reduced in thickness by a grinding method. At this time, the columnar wirings 68 are partially exposed so that an exposed portions of the columnar wirings 68 are formed on the same plane on the magnetic material 69. At this time, thinning of the inductor component can be promoted by grinding the magnetic material 69 to a thickness sufficient to obtain an inductance.

At this time, it is preferable not to grind the magnetic material 69A. When the magnetic material 69A contains aeolotropic metal magnetic substance filler, unexpected shedding of particles may occur due to variation in the aspect ratio of the metal magnetic substance filler, and magnetic resistance possibly becomes higher. In addition, when the magnetic material 69A contains a pressed powder of a metal magnetic substance, metal magnetic substance plate, metal magnetic substance foil and the like, the effective magnetic permeability is severely reduced due to the grinding of the magnetic material 69A, and the grinding itself is highly difficult. Therefore, it is preferable to grind only the magnetic material 69 to expose a columnar electrode and adjust the chip thickness.

Figure 3L:
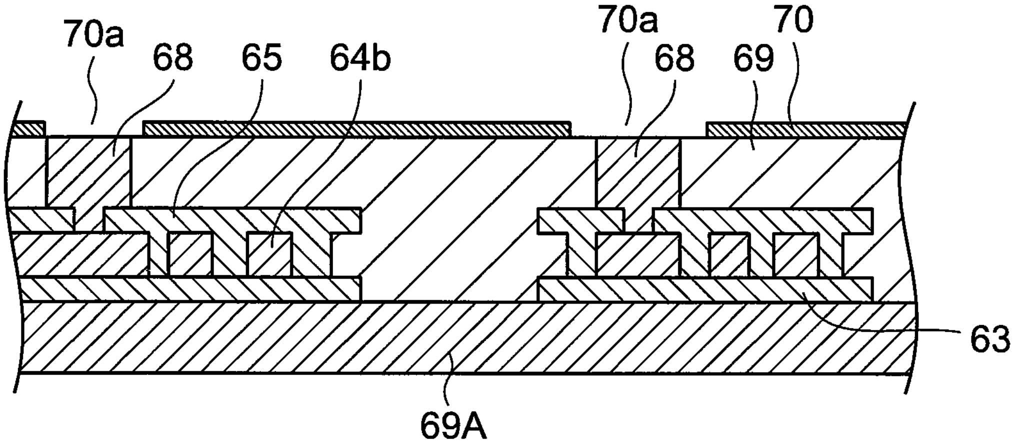
FIG. 3L is an explanatory view for explaining the manufacturing method of the inductor component according to the first embodiment.

Subsequently, as shown in FIG. 3L, an insulating resin (a coating film) 70 is formed on a surface of the magnetic material 69 by a printing method. Opening parts 70*a* of the insulating resin 70 are used as parts in which external terminals are to be formed. The printing method is used in this example; however, the opening parts 70*a* may also be formed by a photolithography method.

Figure 3M:
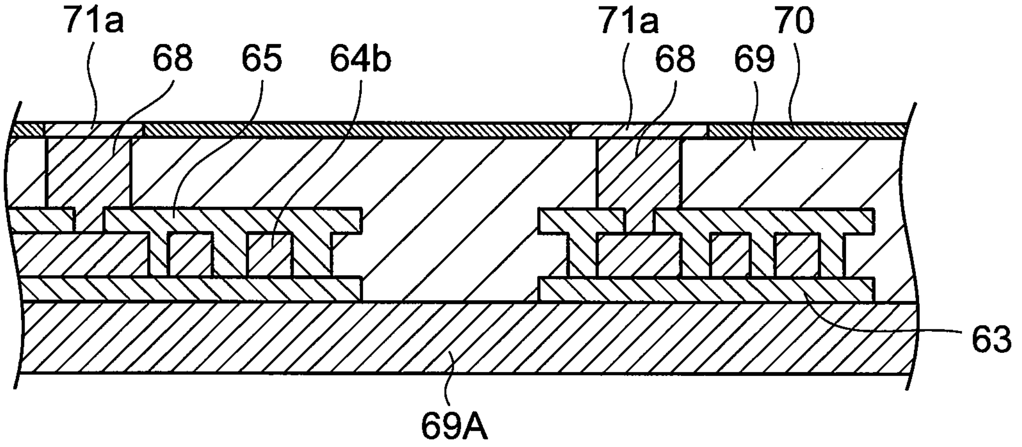
FIG. 3M is an explanatory view for explaining the manufacturing method of the inductor component according to the first embodiment.
Figure 3N:
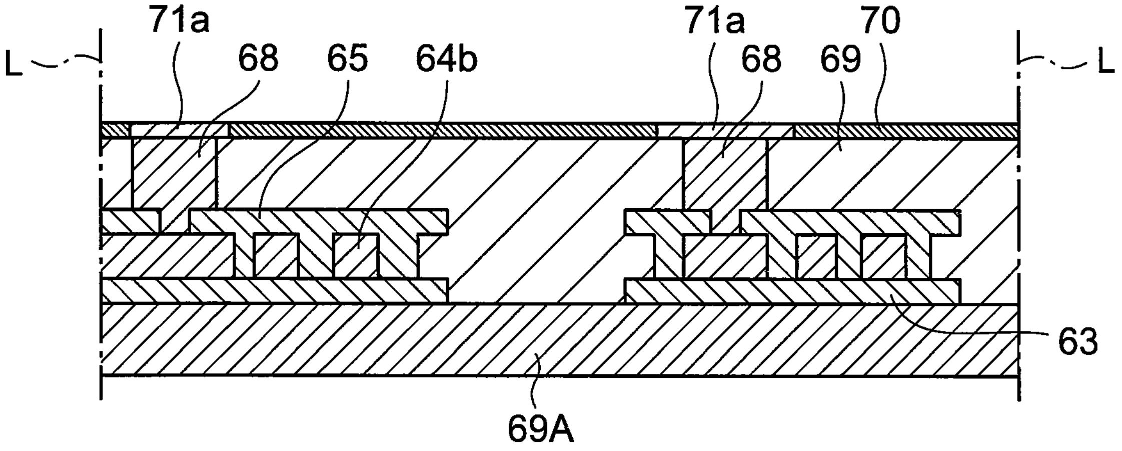
FIG. 3N is an explanatory view for explaining the manufacturing method of the inductor component according to the first embodiment.

Then, as shown in FIG. 3M, an electroless copper plating and/or a plating coating of Ni, Au and the like is applied to form external terminals 71*a*. Then, as shown in FIG. 3N, dicing is performed along broken line portions L to form individual pieces to obtain an inductor component 1 as shown in FIGS. 1 and 2. Although not shown in FIG. 3B and the subsequent drawings, the inductor components 1 may be formed on both surfaces of the dummy core substrate 61, or a plurality of inductor components 1 arranged in a matrix may also be formed on the dummy core substrate 61. With this configuration, higher productivity can be achieved.

Arbitrary wiring layers can be formed by repeating the steps shown in FIG. 3B to FIG. 3D. In the present embodiment, the inductor component includes one spiral wiring 21; however, the inductor component may include two or more spiral wirings 21. The number of turns can be increased by providing a plurality of the spiral wiring to acquire further higher inductance.

Second Embodiment

Figure 4:
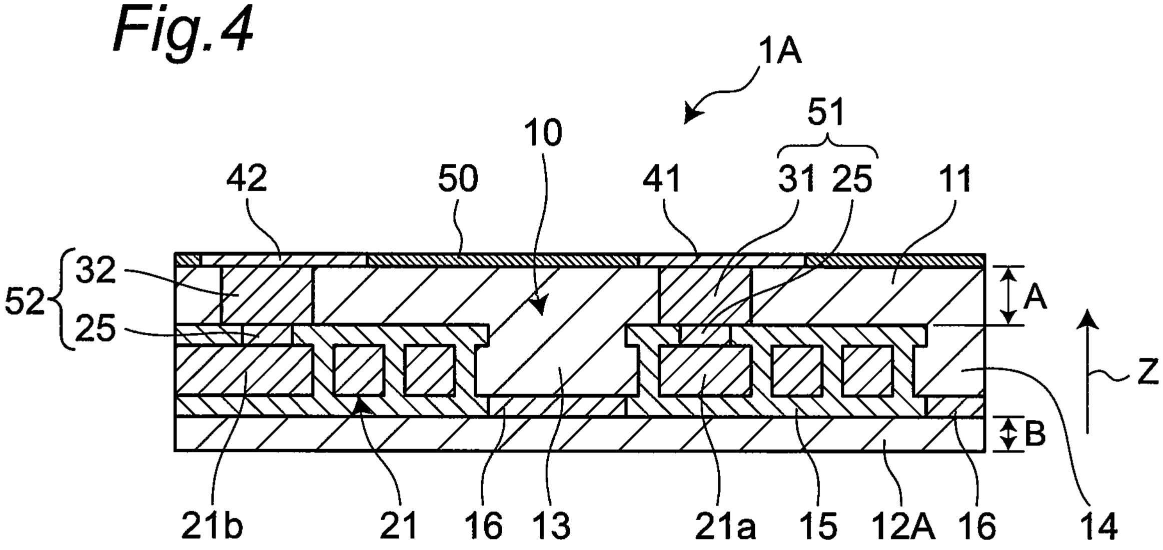
FIG. 4 is a cross-sectional view of an inductor component according to a second embodiment.

A cross-sectional view of the inductor component 1A according to the second embodiment of the present disclosure is shown in FIG. 4. The inductor component 1A according to the second embodiment is different from the inductor component 1 according to the first embodiment in that it has a region where an existing amount of the magnetic substance filler is smaller relative to the first magnetic layer and the second magnetic layer or an organic resin layer 16 between the first magnetic layer and the second magnetic layer. The different configuration will be described below. In the inductor component 1A according to the second embodiment, the same reference numerals as the inductor component 1 according to the first embodiment denote the same constituent elements as the inductor component 1 according to the first embodiment, the explanation of which will be omitted in the following descriptions. As clearly introduced from FIG. 4, the mounting area can also be decreased, and the adverse effect on the inductance acquisition efficiency can also be reduced by the configuration of the inductor component 1A.

Figure 5:
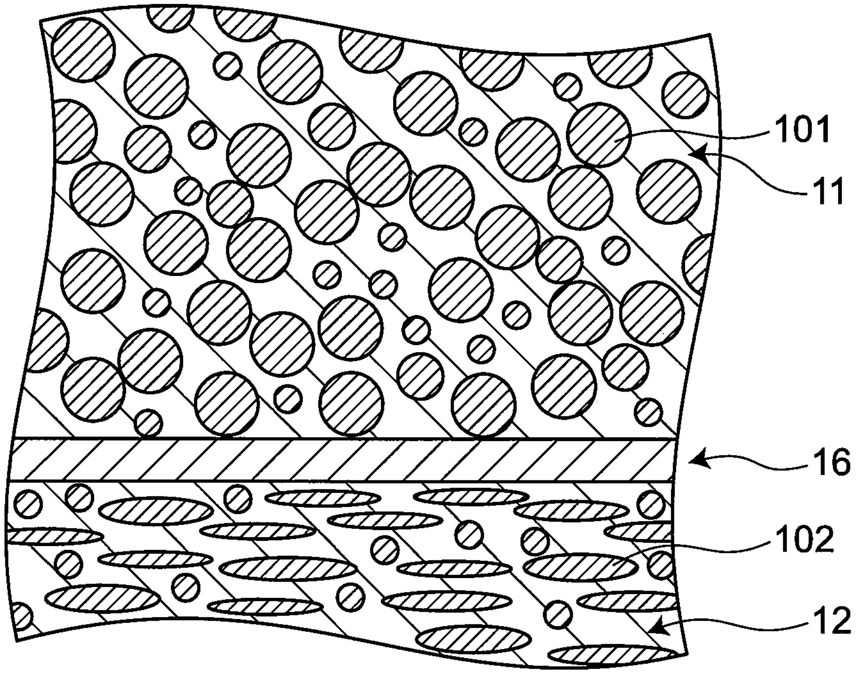
FIG. 5 is an enlarged cross-sectional view of the inductor component according to the second embodiment.

FIG. 5 is an enlarged view of the inductor component 1A. As shown in FIG. 5, a region (denoted by the reference numeral 16 in FIG. 5) where an existing amount of the magnetic substance is smaller relative to the first magnetic layer 11 and the second magnetic layer 12 exists in at least a part of an area between the first magnetic layer 11 and the second magnetic layer 12. This region may include the binding resin contained in the first magnetic layer 11 and/or the binding resin contained in the second magnetic layer 12, or may include an organic resin other than those in the first magnetic layer 11 and the second magnetic layer 12.

The region where the existing amount of the magnetic substance filler is smaller relative to the first magnetic layer 11 and the second magnetic layer 12 between the first magnetic layer 11 and the second magnetic layer 12 serves as a pseudo nonmagnetic part. Therefore, magnetic saturation characteristics can be improved by this region.

At this time, a maximum distance between the first magnetic layer 11 and the second magnetic layer 12 sandwiching said region is preferably from 0.5 μm to 30 μm. When the maximum distance is 0.5 μm or more, the magnetic saturation characteristics can be furthermore improved. When the maximum distance is 30 μm or less, the reduction in the effective magnetic permeability of the inductor component can be further suppressed. The larger the maximum distance is, the higher the effect of improving the magnetic saturation characteristics is. On the other hand, when the maximum distance is too large, a risk of leakage of the magnetic flux from the region occurs, and an effective magnetic permeability of the inductor component is possibly decreased.

Alternatively, the inductor component 1A may include an organic resin layer (denoted by a reference numeral 16 in FIG. 5) directly sandwiched between the first magnetic layer 11 and the second magnetic layer 12 which does not contain a magnetic substance filler, in place of the region 16 where the existing amount of the magnetic substance filler is smaller. A material for the organic resin layer 16 may be composed of the same material as the binding resin contained in the first magnetic layer 11 and/or the binding resin contained in the second magnetic layer 12, or may be composed of a different material. The organic resin layer 16 can improve an adhesion between the first magnetic layer 11 and the second magnetic layer 12. Since the metal magnetic substance filler does not exist in the organic resin layer 16, the organic resin layer 16 also serves as a nonmagnetic part, and thus it can improve the magnetic saturation characteristics.

A maximum thickness of the organic resin layer 16 is preferably from 0.5 μm to 30 μm. When the organic resin layer 16 has a maximum thickness of 0.5 μm or more, the adhesion between the first magnetic layer 11 and the second magnetic layer 12 can be furthermore improved, and the magnetic saturation characteristics can be furthermore improved. When the organic resin layer 16 has a maximum thickness of 30 μm or less, reduction in the effective magnetic permeability of the inductor component can further be prevented.

The organic resin layer 16 can be formed by a phenomenon that an element constituting the first magnetic layer 11 and an element constituting the second magnetic layer 12 are diffused and flow into an interface between the first magnetic layer 11 and the second magnetic layer 12 when the first magnetic layer 11 and the second magnetic layer 12 are press-bonded to each other during the manufacturing process. In this case, the region with small amount of the magnetic substance filler can be formed without adding a special process. Alternatively, the organic resin layer 16 may be formed by use of a resin sheet and the like separately from the first magnetic layer 11 and the second magnetic layer 12. By providing such an organic resin layer 16, the adhesion between the first magnetic layer 11 and the second magnetic layer 12 can be improved. In addition, the organic resin layer 16 also serves as a nonmagnetic part since it does not contain the magnetic substance filler. Accordingly, the magnetic saturation characteristics can be improved by the organic resin layer.

In the inductor component 1A according to the present embodiment, at least one of distances between a metal magnetic substance filler in the first magnetic layer 11 and a metal magnetic substance filler in the second magnetic layer 12 which is adjacent to said metal magnetic substance filler in the first magnetic layer 11 is larger than a distance between metal magnetic substance fillers adjacent to each other in the first magnetic layer 11 and the second magnetic layer 12. When such a distance exists, the magnetic saturation characteristics can be improved. In this case, at least one of distances between a metal magnetic substance filler in the first magnetic layer 11 and a metal magnetic substance filler in the second magnetic layer 12 which is adjacent to said metal magnetic substance filler in the first magnetic layer 11 is preferably from 0.5 μm to 3 μm. When at least one of the distances is 0.5 μm or more, the magnetic saturation characteristics can be furthermore improved. When at least one of the distances is 3 μm or less, reduction in the effective magnetic permeability of the inductor component can be further suppressed.

The inductor component 1A according to the present embodiment may further include a void part directly sandwiched between the first magnetic layer 11 and the second magnetic layer 12, in place of or in addition to the organic resin layer 16. By the void part between the first magnetic layer 11 and the second magnetic layer 12, a stress which may occur due to the difference in linear expansion coefficients between the different materials can be relaxed when a load such as thermal shock is applied to the inductor component 1A. The void part also serves as a nonmagnetic part. Accordingly, the void part can improve the magnetic saturation characteristics.

A maximum thickness of the void part is preferably from 0.5 μm to 30 μm. When the void part has a maximum thickness of 0.5 μm or more, effects of relaxing the stress and improving magnetic saturation characteristics are furthermore increased. On the other hand, when the void part has a maximum thickness of 30 μm or less, excellent acquisition efficiency of inductance can be achieved, and simultaneously, reduction in strength of the element body can be prevented. The effects of relaxing the stress and improving magnetic saturation characteristics are likely to be higher with increasing the maximum thickness of the void part. On the other hand, when the void part has too large maximum thickness, there is a risk of decreasing the acquisition efficiency of inductance, and there is also a risk of decreasing the strength of the element body.

In the inductor component according to the present embodiment, when the region where the existing amount of the magnetic substance filler is smaller exists, when the inductor component includes the organic resin layer which does not contain the magnetic substance filler, or when at least one of distances between a metal magnetic substance filler in the first magnetic layer and a metal magnetic substance filler in the second magnetic layer which is adjacent to said metal magnetic substance filler in the first magnetic layer is from 0.5 μm to 3 μm as described above, the effective magnetic permeability of the inductor component may be from 40 to 200. In this case, a degree of freedom in chip design is improved so that the thinning of the inductor component is further readily achieved.

The maximum thickness of the organic resin layer 16 (the region 16 between the first magnetic layer 11 and the second magnetic layer 12 where the existing amount of the metal magnetic substance filler is smaller relative to the first magnetic layer 11 and the second magnetic layer 12), the distance between the metal magnetic substance fillers in the organic resin layer 16, and the maximum thickness of the void part can be analyzed by a procedure described below. A cross section of the inductor component 1A is formed by grinding or the like in such a manner that the inner magnetic path part 13 (the first magnetic layer 11) and the second magnetic layer 12 is included in the same plane. In this cross section, an area in the vicinity of an boundary between the second magnetic layer 12 and the inner magnetic path part 13 is analyzed by a SEM image with a magnification of 200 to 2000 times. In the SEM image, when at least one of distances between the metal magnetic substance filler 101 in the inner magnetic path part 13 and the metal magnetic substance filler 102 in the second magnetic layer 12 which is adjacent to said metal magnetic substance filler 101 is larger than a distance between the metal magnetic substance fillers adjacent to each other in the inner magnetic path part 13 and the second magnetic layer 12, a space corresponding to such distance is defined as the organic resin layer 16 (when the organic resin exists in the space) or the void part (when the organic resin does not exist in the space), and the maximum value of the distances is defined as a maximum thickness of the organic resin layer 16 or a maximum thickness of the void part.

(Simulation)

Figure 6A:
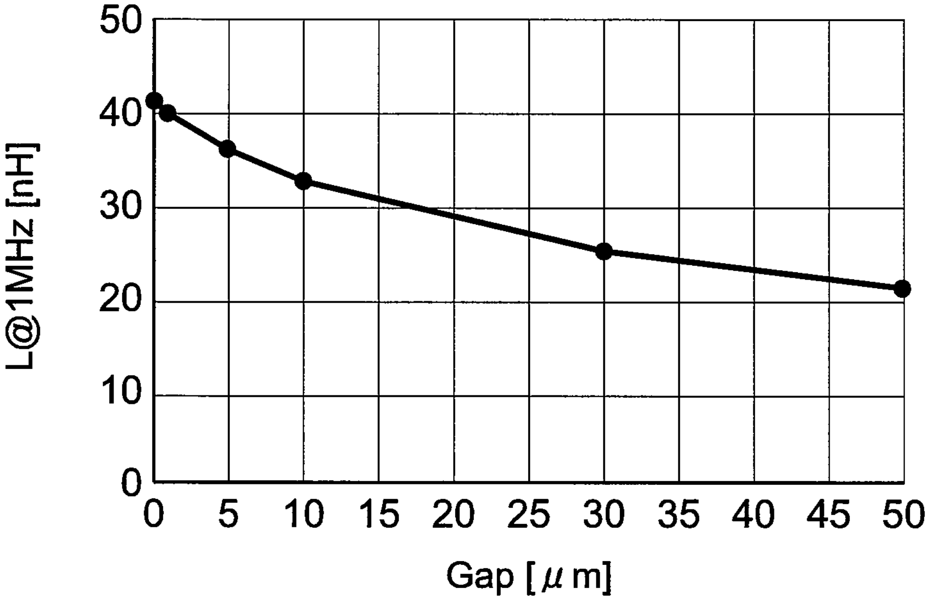
FIG. 6A is a graph showing a simulation result of the inductor component according to the second embodiment.
Figure 6B:
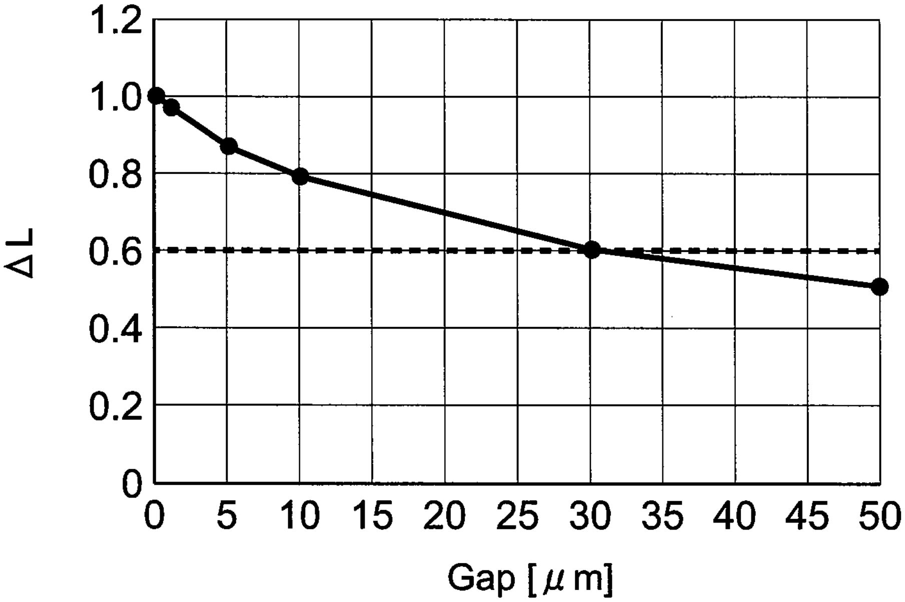
FIG. 6B is a graph showing a simulation result of the inductor component according to the second embodiment.

A simulation based on the configuration of the inductor component 1A was carried out to demonstrate an effect by the configuration of the inductor component 1A. FIG. 6A and FIG. 6B show a simulation result. FIG. 6A shows a relation between the thickness of the organic resin layer 16 and the inductance (L). FIG. 6B shows a relation between the thickness of the organic resin layer 16 and inductance change (ΔL). For a simulator, the electromagnetic field simulator HFSS (manufactured by Synopsis) was used. The magnetic permeability μ of the first magnetic layer 11 was set to be 26.5, and the magnetic permeability μ of the second magnetic layer 12 was set to be 70. The L-acquisition frequency was 1 MHz, the chip size was 1.2 mm in length×1.0 mm in width, the chip thickness was 0.200 mm when the thickness of the organic resin layer 16 was zero, the number of turns of the spiral wiring 21 was 2.5, and the dimension of the spiral wiring was L/S/t=60 μm/10 μm/70 μm. The thicknesses of the first magnetic layer 11 (except for the inner magnetic path part 13 and the outer magnetic path part 14) and the second magnetic layer 12 were both 42.5 μm. As shown in FIG. 6B, when the organic resin layer 16 has a thickness of 30 μm or less, a rate of decrease in inductance can be suppressed by 40% or less.

Third Embodiment

Figure 7A:
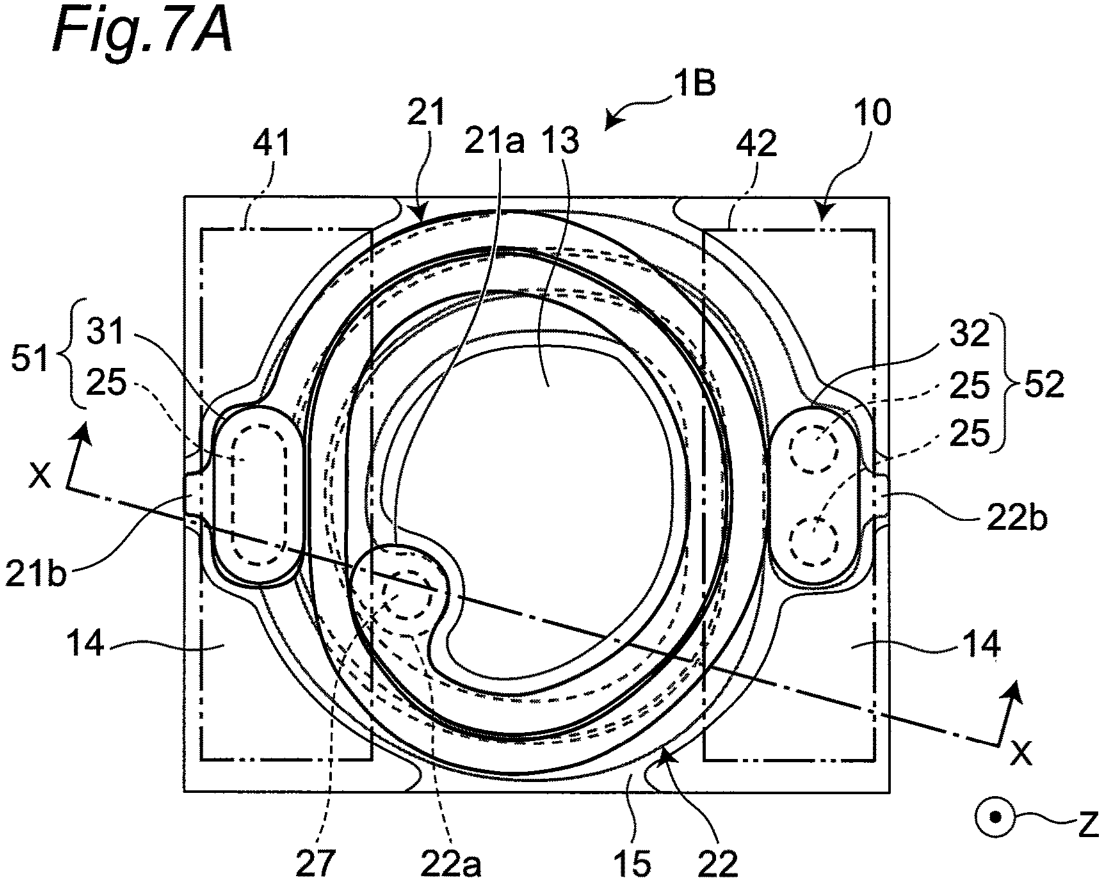
FIG. 7A is a perspective plane view of an inductor component according to a third embodiment.
Figure 7B:
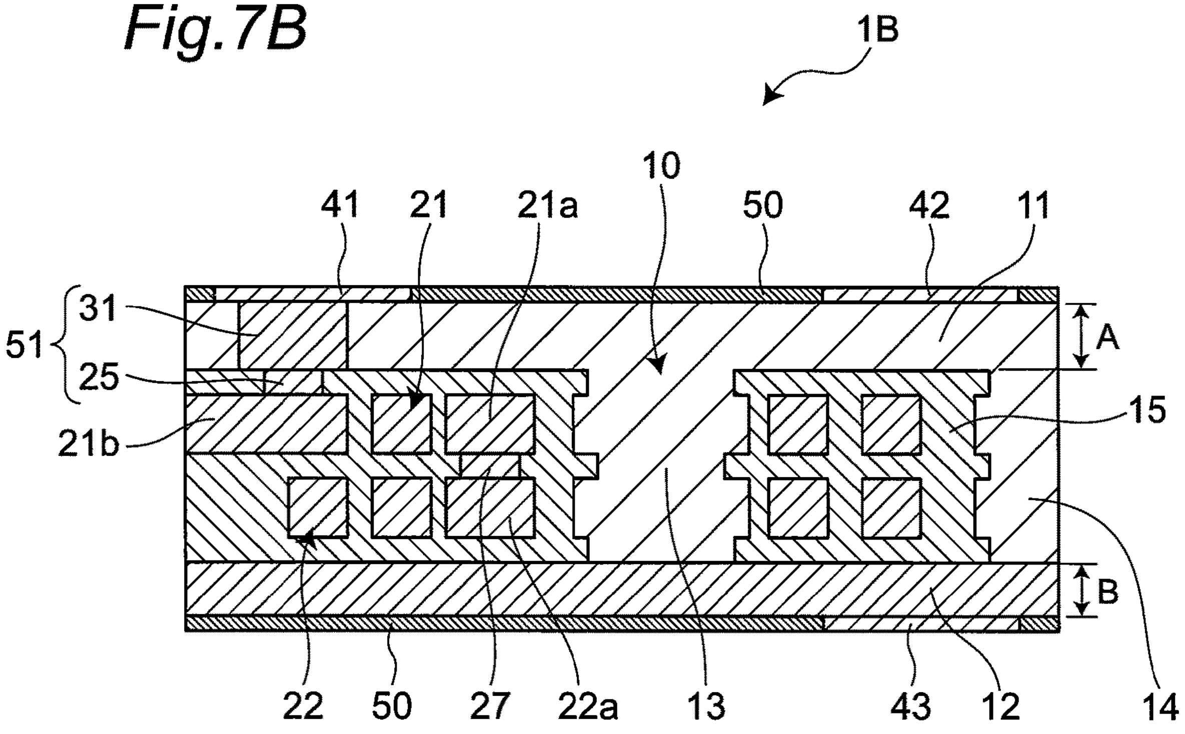
FIG. 7B is a cross-sectional view of the inductor component according to the third embodiment.

FIG. 7A is a perspective plane view of the inductor component 1B according to the third embodiment of the present disclosure. FIG. 7B is a cross-sectional view taken along a line X-X of the inductor component shown in FIG. 7A. The inductor component 1B according to the third embodiment is different from the inductor component 1 according to the first embodiment in the configuration of the spiral wiring. In the inductor component 1B according to the third embodiment, the same reference numerals as the inductor component 1 according to the first embodiment denote the same constituent elements as the inductor component 1 according to the first embodiment, the explanation of which will be omitted in the following descriptions.

In the present embodiment, the inductor component 1B includes a plurality of spiral wirings 21 and 22, and further includes a via conductor 27 connecting the spiral wirings with one another in series between the plurality of spiral wirings. The same layer as the via conductor including the via conductor 27 contains only a conductor, an inorganic filler and an organic resin. The number of turns is increased by increase in the number of the spiral wirings. As a result, the acquisition efficiency of inductance can be further increased. In addition, since the inductor component 1B does not include a base material such as glass cloth between the spiral wirings which requires a certain thickness, thinning of the inductor component can be achieved even if the number of the spiral wiring is increased.

Hereinafter, the inductor component 1B according to the present embodiment will be described in detail. As shown in FIGS. 7A and 7B, the inductor component 1B includes vertical wirings 51, 52 extending from the spiral wirings 21 and 22 in the Z direction to pass through the first magnetic layer 11, similarly to the inductor component 1. The inductor component 1B also includes a connecting terminal 43 (a dummy external terminal) which is not electrically connected to the spiral wirings 21 and 22 and is connected to the external circuit. When the connecting terminal 43 is connected to a ground of the external circuit, the connecting terminal 43 serves as a magnetic shield. When the connecting terminal 43 is connected to a heat dissipation path of the external circuit, heat dissipation of the inductor component 1B is improved.

A plurality of spiral wiring, a first spiral wiring 21 and a second spiral wiring 22, are present in the inductor component 1B. The inductor component 1B further includes a second via conductor 27 connecting between the first spiral wiring 21 and the second spiral wiring 22 in series. Specifically described, the first spiral wiring 21 and the second spiral wiring 22 are laminated in the Z direction. The first spiral wiring 21 is spirally wound in an anticlockwise direction from an outer circumferential end 21*b* toward an inner circumferential end 21*a* as viewed from above. The second spiral wiring 22 is spirally wound in an anticlockwise direction from an inner circumferential end 22*a* toward an outer circumferential end 22*b* as viewed from above.

The outer circumferential end 21*b* of the first spiral wiring 21 is connected to the first external terminal 41 through the first vertical wiring 51 (the via conductor 25 and the first columnar wiring 31) above the outer circumferential end 21*b* of the first spiral wiring 21. The inner circumferential end 21*a* of the first spiral wiring 21 is connected to the inner circumferential end 22*a* of the second spiral wiring 22 through the second via conductor 27 below the inner circumferential end 21*a* of the first spiral wiring 21.

The outer circumferential end 22*b* of the second spiral wiring 22 is connected to the second external terminal 42 through the second vertical wiring 52 (the via conductor 25 and the second columnar wiring 32) above the outer circumferential end 22*b* of the second spiral wiring 22.

The same layer as the second via conductor 27 including the second via conductor 27 only contains a conductor, an inorganic filler and an organic resin. That is, the same layer only includes the second via conductor 27, the insulating layer 15 and the magnetic layer 10. Therefore, since the same layer as the second via conductor 27 does not include the conventional printed circuit board, the inductor component can have higher acquisition efficiency of inductance and suppressed magnetic flux leakage even when the inductor component is made thin. The "same layer as the second via conductor 27" means a portion (layer) located at the same position as a region from an upper end to a lower end of the second via conductor 27 with respect to the normal direction (Z direction). In other words, the "same layer as the second via conductor 27" means a portion (layer) located in the same plane as a region from the upper end to the lower end of the second via conductor 27 with respect to a plane parallel to the plane on which the spiral wiring 21 is wound.

The same layer as the second via conductor 27 preferably has a thickness of from 1 μm to 20 μm. Therefore, since the same layer as the second via conductor 27 has a thickness of 1 μm or more, a short circuit between the spiral wirings can be reliably prevented; and since the same layer as the second via conductor 27 has a thickness of 20 μm or less, a thin inductor component 1B can be provided.

The inorganic filler may be made of, for example, FeSi-based alloy, FeCo-based alloy, FeAl-based alloy or an amorphous alloy thereof or $SiO_2$. An average particle diameter of the inorganic filler is preferably 5 μm or less. By such configuration, a thin inductor component 1B with smaller loss at high frequency can be provided.

In the inductor component 1B, the first magnetic layer 11 through which the vertical wirings 51, 52 pass has a magnetic permeability lower than the magnetic permeability of the second magnetic layer 12 through which the vertical wirings 51, 52 do not pass, similarly to the inductor components 1 and 1A. Therefore, the mounting area can be reduced and the adverse effect on the inductance acquisition efficiency can be reduced also by the configuration of the inductor component 1B.

In addition, since the first spiral wiring 21 and the second spiral wiring 22 are connected in series by the second via conductor 27 in the inductor component 1B, the inductance value can be improved by increasing the number of turns. In addition, since the first to the third vertical wirings 51 to 53 can be taken from the outer circumferences of the first spiral wiring 21 and the second spiral wiring 22, the inner diameters of the first spiral wiring 21 and the second spiral wiring 22 can be made larger to improve the inductance value.

In addition, since the first spiral wiring 21 and the second spiral wiring 22 are respectively laminated in the normal direction, an area of the inductor component 1B as viewed in the Z direction relative to the number of turns, that is, the mounting area can be reduced to attain miniaturization of the inductor component 1B.

The inductor component 1B has a configuration including an even number of the spiral wirings connected in series. However, the inductor component is not limited to such configuration, and may include an odd number of the spiral wirings connected in series. Since the vertical wiring is led out from the spiral wiring in the Z direction, it is not necessary to lead out one end portion of the inductor at a side of the outer circumference, even when the inductor component includes an odd number of the spiral wirings connected in series with said one end portion arranged at a side of the inner circumference. Therefore, thinning of the inductor component can be achieved in this case. In addition, a degree of freedom in the number of the spiral wirings connected in series is improved in this manner, and thus a degree of freedom in setting range of the inductance value is also improved.

In the inductor component 1B, one inductor composed of two layers of the spiral wirings is arranged on the same plane. However, two or more inductors may also be arranged on the same plane.

What is claimed is:

1. An inductor component comprising:

a spiral wiring wound on a plane;

a first magnetic layer and a second magnetic layer located at positions sandwiching the spiral wiring from both sides in a normal direction relative to the plane on which the spiral wiring is wound, the first magnetic layer having magnetic permeability lower than that of the second magnetic layer;

a first vertical wiring extending from an inner circumferential end of the spiral wiring in the normal direction to pass through the first magnetic layer;

a second vertical wiring extending from an outer circumferential end of the spiral wiring in the normal direction to pass through the first magnetic layer;

an external terminal disposed on a surface of the first magnetic layer to connect an end surface of the first vertical wiring or the second vertical wiring; and a coating layer on the first magnetic layer, wherein the external terminal is disposed in an opening part of the coating layer, and an inner magnetic path part of the first magnetic layer partially surrounds a portion of the first vertical wiring in plan view.

2. The inductor component according to claim 1, wherein the first magnetic layer and the second magnetic layer comprise a metal magnetic substance filler and a binding resin.

3. The inductor component according to claim 2, wherein a cross section of the metal magnetic substance filler is exposed on an external principal surface of the first magnetic layer.

4. The inductor component according to claim 2, wherein an external principal surface of the second magnetic layer is covered with an organic resin.

5. The inductor component according to claim 2, wherein all of an external principal surface of the second magnetic layer is covered with the binding resin, and does not comprise a cross section of the metal magnetic substance filler exposed thereon.

6. The inductor component according to claim 2, wherein the metal magnetic substance filler in the first magnetic layer is substantially spherical, and the metal magnetic substance filler in the second magnetic layer comprises a flattened metal magnetic substance filler.

7. The inductor component according to claim 6, wherein the flattened metal magnetic substance filler is disposed such that a major axis direction of the metal magnetic substance filler is substantially parallel to the plane on which the spiral wiring is wound.

8. The inductor component according to claim 6, wherein the second magnetic layer is in a shape of a rectangle as viewed from above, and a longer side of the rectangle is substantially parallel to a major axis direction of the flattened metal magnetic substance filler.

9. The inductor component according to claim 1, wherein the second magnetic layer comprises at least one of a pressed powder of a metal magnetic substance, a metal magnetic substance plate and a metal magnetic substance foil.

10. The inductor component according to claim 9, wherein a total content of the pressed powder of the metal magnetic substance, the metal magnetic substance plate and the metal magnetic substance foil in the second magnetic layer is 90% by volume or more.

11. The inductor component according to claim 6, wherein a region where an existing amount of the magnetic substance filler is smaller relative to the first magnetic layer and the second magnetic layer exists between the first magnetic layer and the second magnetic layer.

12. The inductor component according to claim 11, wherein a maximum distance between the first magnetic layer and the second magnetic layer with the region sandwiched therebetween is from 0.5 μm to 30 μm.

13. The inductor component according to claim 6, wherein the inductor component comprises an organic resin layer directly sandwiched between the first magnetic layer and the second magnetic layer which contains no magnetic substance filler.

14. The inductor component according to claim 13, wherein a maximum thickness of the organic resin layer is from 0.5 μm to 30 μm.

15. The inductor component according to claim 6, wherein at least one of distances between a metal magnetic substance filler in the first magnetic layer and a metal magnetic substance filler in the second magnetic layer which is adjacent to said metal magnetic substance filler in the first magnetic layer is from 0.5 μm to 3 μm.

16. The inductor component according to claim 11, wherein the inductor component further comprises a void part directly sandwiched between the first magnetic layer and the second magnetic layer.

17. The inductor component according to claim 16, wherein a maximum thickness of the void part is preferably from 0.5 μm to 30 μm.

18. The inductor component according to claim 11, wherein the inductor component has effective magnetic permeability of from 40 to 200.

19. The inductor component according to claim 1, wherein the spiral wiring is covered with an insulating layer at least at its wound portion.

20. The inductor component according to claim 1, further comprising:

a plurality of the spiral wiring, and further comprising a via conductor connecting the spiral wirings to each other in series between the plurality of spiral wiring, wherein a same layer as the via conductor comprising the via conductor comprises only a conductor, an inorganic filler and an organic resin.

21. The inductor component according to claim 1, wherein the first magnetic layer has a thickness different from a thickness of the second magnetic layer.

22. The inductor component according to claim 1, wherein a portion of the inner magnetic path part that partially surrounds the portion of the first vertical wiring overlaps a portion of an insulating layer.

23. An inductor component comprising:

a spiral wiring wound on a plane;

a first magnetic layer and a second magnetic layer located at positions sandwiching the spiral wiring from both sides in a normal direction relative to the plane on which the spiral wiring is wound, the first magnetic layer having magnetic permeability lower than that of the second magnetic layer;

a vertical wiring extending from the spiral wiring in the normal direction to pass through the first magnetic layer;

an external terminal disposed on a surface of the first magnetic layer to connect an end surface of the vertical wiring; and a coating layer on the first magnetic layer, wherein the external terminal is disposed in an opening part of the coating layer, the magnetic permeability at an interface between the first magnetic layer and the second magnetic layer changes continuously, and an inner magnetic path part of the first magnetic layer partially surrounds a portion of the vertical wiring in plan view.

24. The inductor component according to claim 23, wherein a portion of the inner magnetic path part that partially surrounds the portion of the vertical wiring overlaps a portion of an insulating layer.

* * * * *